US008520576B2

(12) United States Patent
Kim et al.

(10) Patent No.: US 8,520,576 B2
(45) Date of Patent: Aug. 27, 2013

(54) EXPLICIT FEEDBACK FORMAT WITHIN SINGLE USER, MULTIPLE USER, MULTIPLE ACCESS, AND/OR MIMO WIRELESS COMMUNICATIONS

(75) Inventors: Joonsuk Kim, Saratoga, CA (US); Ron Porat, San Diego, CA (US); Vinko Erceg, Cardiff by the Sea, CA (US)

(73) Assignee: Broadcom Corporation, Irvine, CA (US)

( * ) Notice: Subject to any disclaimer, the term of this patent is extended or adjusted under 35 U.S.C. 154(b) by 195 days.

(21) Appl. No.: 13/196,721

(22) Filed: Aug. 2, 2011

(65) Prior Publication Data

US 2012/0033592 A1 Feb. 9, 2012

Related U.S. Application Data

(60) Provisional application No. 61/370,785, filed on Aug. 4, 2010, provisional application No. 61/390,569, filed on Oct. 6, 2010.

(51) Int. Cl.
*H04B 7/00* (2006.01)
(52) U.S. Cl.
USPC .......................................... 370/310; 375/240
(58) Field of Classification Search
USPC ............................. 370/310, 310.1, 310.2, 338
See application file for complete search history.

(56) References Cited

U.S. PATENT DOCUMENTS

| 2007/0230373 | A1* | 10/2007 | Li et al. | 370/267 |
|---|---|---|---|---|
| 2008/0240208 | A1* | 10/2008 | Lou et al. | 375/211 |
| 2009/0207765 | A1* | 8/2009 | Yamaura | 370/310 |
| 2009/0225722 | A1* | 9/2009 | Cudak et al. | 370/330 |
| 2010/0103832 | A1* | 4/2010 | Zhou et al. | 370/252 |

* cited by examiner

*Primary Examiner* — Hassan Phillips
*Assistant Examiner* — Siren Wei
(74) *Attorney, Agent, or Firm* — Garlick & Markison; Shayne X. Short

(57) ABSTRACT

Explicit feedback format within single user, multiple user, multiple access, and/or MIMO wireless communications. A beamformer provides a first communication to a beamformee, and based thereon, the beamformee may ascertain certain characteristics associated with the type and format of feedback to be provided to the beamformee via a second communication from the beamformee to the beamformer. For example, the first communication may include indication of a current operational mode, such as whether it is in accordance with single-user multiple input multiple output (SU-MIMO) or multi-user multiple-input-multiple-output (MU-MIMO). Also, the first communication may indicate a requested steering matrix's rank to be employed in accordance with subsequent beamforming by the beamformer. Also, additional information such as that pertaining to per-tone SNR values for each respective space-time stream, per-tone or per-sub-band eigen-values, the particular channel width being employed (e.g., 20, 40, 80, or 160 MHz), etc. may be included within the second communication.

20 Claims, 27 Drawing Sheets

● when grouping =2

| MHz | | | | | | | | | | | | | | | | | | | | | | |
|---|---|---|---|---|---|---|---|---|---|---|---|---|---|---|---|---|---|---|---|---|---|---|
| 20 | -28 | -27 | -26 | -25 | -24 | -22 | ooo | -6 | -4 | -3 | -2 | -1 | 1 | 2 | 3 | 4 | 6 | ooo | 22 | 24 | 25 | 26 | 27 | 28 |
| 40 | -58 | -57 | -56 | -55 | -54 | -52 | ooo | -6 | -5 | -4 | -3 | -2 | 2 | 3 | 4 | 5 | 6 | 8 | ooo | 54 | 55 | 56 | 57 | 58 |
| 80 | -122 | -121 | -120 | -119 | -118 | -116 | ooo | -6 | -5 | -4 | -3 | -2 | 2 | 3 | 4 | 5 | 6 | 8 | ooo | 118 | 119 | 120 | 121 | 122 |
| 160 | -250 | -249 | -248 | -247 | -246 | -244 | ooo | -10 | -9 | -8 | -7 | -6 | 6 | 7 | 8 | 9 | 10 | 12 | ooo | 246 | 247 | 248 | 249 | 250 |

● when grouping =4

| MHz | | | | | | | | | | | | | | | | | | | | | | |
|---|---|---|---|---|---|---|---|---|---|---|---|---|---|---|---|---|---|---|---|---|---|---|
| 20 | -28 | -27 | -26 | -25 | -24 | -20 | ooo | -8 | -4 | -3 | -2 | -1 | 1 | 2 | 3 | 4 | 8 | ooo | 20 | 24 | 25 | 26 | 27 | 28 |
| 40 | -58 | -57 | -56 | -55 | -54 | -50 | ooo | -8 | -5 | -4 | -3 | -2 | 2 | 3 | 4 | 5 | 8 | 12 | ooo | 54 | 55 | 56 | 57 | 58 |
| 80 | -122 | -121 | -120 | -119 | -118 | -114 | ooo | -8 | -5 | -4 | -3 | -2 | 2 | 3 | 4 | 5 | 8 | 12 | ooo | 114 | 119 | 120 | 121 | 122 |
| 160 | -250 | -249 | -248 | -247 | -246 | -242 | ooo | -10 | -9 | -8 | -7 | -6 | 6 | 7 | 8 | 9 | 10 | 14 | ooo | 242 | 247 | 248 | 249 | 250 |

FIG. 19

| order | information |
|---|---|
| 1 | Category (=VHT) |
| 2 | Action (=Compressed Beamforming) |
| 3 | VHT MIMO Control |
| 4 | Compressed Beamforming Report |
| 5 | MU-exclusive Beamforming Report |

Angle resolution (missing)

Tone/mapping/grouping (missing)

Additional fields may be added for MU

| B0 ... B2 | 0 | 1 | 2 | 3 |
|---|---|---|---|---|
| (bψ, bφ) for SU | reserved | (2, 4) | (3, 5) | (4, 6) |
| (bψ, bφ) for MU | reserved | (5, 7) | (6, 8) | (7, 9) |

B

| B0 ... B2 | 1 | 3 |
|---|---|---|
| (bψ, bφ) for SU | (2, 4) | (4, 6) |
| (bψ, bφ) for MU | (5, 7) | (7, 9) |

FIG. 21

| Fields common for both SU and MU | | |
|---|---|---|
| MU | 0: SU FB | 1: MU FB |
| Nc | 0~7 correspond to 1~8 columns | |
| Nr | 0~7 correspond to 1~8 rows | |
| BW | 0: SU FB | 1: MU FB |
| Ng | 0: Ng=1 | 1: Ng=2 | 2: Ng=4 | |
| Codebook Info | SU mode (MU-type bit not set) | 0: Reserved | 1: (2, 4) | 2: (3, 5) | 3: (4, 6) |
| | MU mode (MU-type bit set) | 0: Reserved | 1: (5, 7) | 2: (6, 8) | 3: (7, 9) |
| Sounding Sequence # | | |

| 3 | 3 | 2 | 2 | 2 | 8 | 1 |
|---|---|---|---|---|---|---|
| Nc | Nr | BW | Ng | Codebook Info | Sounding Seq # | MU-type | TBD |

● when grouping =2

| MHz | | | | | | | | | | | | | | | | | | | | | | | | | |
|---|---|---|---|---|---|---|---|---|---|---|---|---|---|---|---|---|---|---|---|---|---|---|---|---|---|
| 20 | -28 | -27 | -26 | -25 | ooo | -6 | -4 | -3 | -2 | -1 | 1 | 2 | 3 | 4 | 6 | ooo | 22 | 24 | 25 | 26 | 27 | 28 |
| 40 | -58 | -57 | -56 | -55 | ooo | -6 | -5 | -4 | -3 | -2 | 2 | 3 | 4 | 5 | 6 | 8 | ooo | 54 | 55 | 56 | 57 | 58 |
| 80 | -122 | -121 | -120 | -119 | ooo | -6 | -5 | -4 | -3 | -2 | 2 | 3 | 4 | 5 | 6 | 8 | ooo | 118 | 119 | 120 | 121 | 122 |

● when grouping =4

| MHz | | | | | | | | | | | | | | | | | | | | | | | | | |
|---|---|---|---|---|---|---|---|---|---|---|---|---|---|---|---|---|---|---|---|---|---|---|---|---|---|
| 20 | -28 | -27 | -26 | -25 | ooo | -6 | -4 | -3 | -2 | -1 | 1 | 2 | 3 | 4 | 6 | ooo | 22 | 24 | 25 | 26 | 27 | 28 |
| 40 | -58 | -57 | -56 | -55 | ooo | -6 | -5 | -4 | -3 | -2 | 2 | 3 | 4 | 5 | 6 | 8 | ooo | 54 | 55 | 56 | 57 | 58 |
| 80 | -122 | -121 | -120 | -119 | ooo | -6 | -5 | -4 | -3 | -2 | 2 | 3 | 4 | 5 | 6 | 8 | ooo | 118 | 119 | 120 | 121 | 122 |

| 40 MHz, 4×1, 4 STA, 11ac channel D, 200 channel realizations | | | | | | | | | | | |
|---|---|---|---|---|---|---|---|---|---|---|---|
| | 10 dB | 13 dB | 16 dB | 19 dB | 22 dB | 25 dB | 28 dB | 31 dB | 34 dB | 37 dB | 40 dB |
| Un-quantized SV feedback Avg throughput | 126.5 | 167.7 | 224.0 | 282.7 | 369.3 | 416.5 | 489.6 | 539.3 | 574.9 | 640.4 | 693.7 |
| | loss in % relative to first line | | | | | | | | | | |
| SV-Dec1 V-8 bits, S-4 bits | 0.1 | 0 | 0.1 | 0 | 0.2 | 0.2 | 0.3 | 0.2 | 0.9 | 1.7 | 1.6 |
| SV-Dec4 V-8 bits, S-4 bits | 0.2 | 0.1 | 0.1 | 0.2 | 0.6 | 0.9 | 1.9 | 1.2 | 3.3 | 7.4 | 9.3 |

FIG. 25

| Field | Size |
|---|---|
| per-tone-SNR for carrier at negative band edge | Nd × Nc |
| per-tone-SNR for carrier at negative band edge + Ng | Nd × Nc |
| ... | ... |
| per-tone-SNR for carrier at negative DC edge | Nd × Nc |
| per-tone-SNR for carrier at positive DC edge | Nd × Nc |
| per-tone-SNR for carrier at positive DC edge + Ng | Nd × Nc |
| ... | ... |
| per-tone-SNR for carrier at positive band edge | Nd × Nc |

FIG. 26

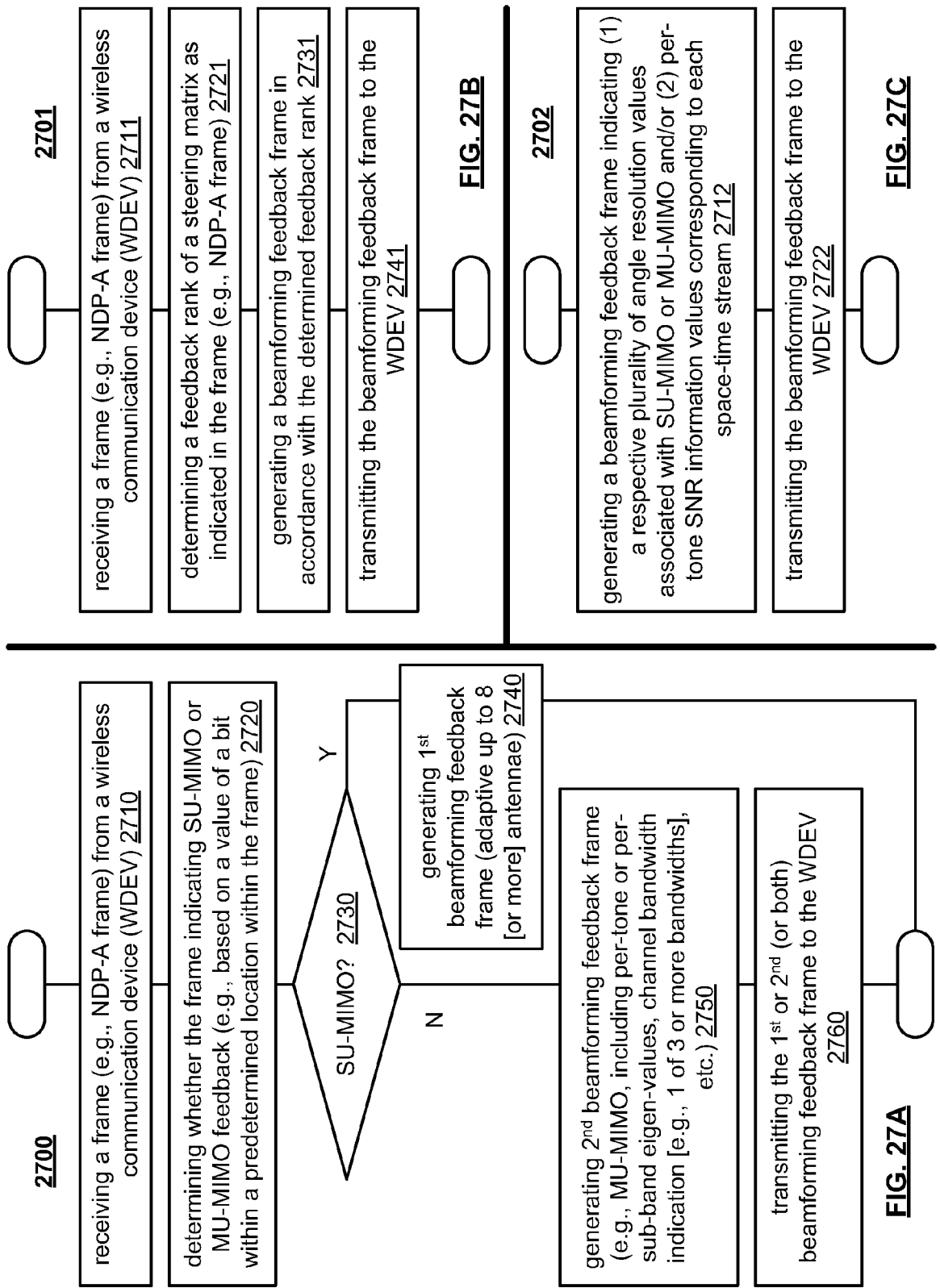

EXPLICIT FEEDBACK FORMAT WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent applications which are hereby incorporated herein by reference in their entirety and made part of the present U.S. Utility patent application for all purposes:

1. U.S. Provisional Application Ser. No. 61/370,785, entitled "Explicit feedback format within single user, multiple user, multiple access, and/or MIMO wireless communications," filed Aug. 4, 2010, pending.

2. U.S. Provisional Application Ser. No. 61/390,569, entitled "Explicit feedback format within single user, multiple user, multiple access, and/or MIMO wireless communications," filed Oct. 6, 2010, pending.

INCORPORATION BY REFERENCE

The following IEEE standards are hereby incorporated herein by reference in their entirety and are made part of the present U.S. Utility patent application for all purposes:

1. IEEE Std 802.11™-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1233 pages.

2. IEEE Std 802.11™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11™-2009, (Amendment to IEEE Std 802.11™-2007 as amended by IEEE Std 802.11™-2008, IEEE Std 802.11r™-2008, IEEE Std 802.11y™-2008, and IEEE Std 802.11r™-2009), 536 pages.

3. IEEE P802.11ac™/D1.0, May 2011, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz," Prepared by the 802.11 Working Group of the 802 Committee, 263 total pages (pp. i-xxi, 1-242).

BACKGROUND OF THE INVENTION

1. Technical Field of the Invention

The invention relates generally to communication systems; and, more particularly, it relates to formatting in accordance with providing explicit feedback within single user, multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIG. 19 is a diagram illustrating an embodiment of a tables respectively showing resulting fed back tones with different baseline tone grouping, and particularly, showing tone grouping 2 (with added tone grouping of 1 in zones 1 and 2) and tone grouping 4 (with added tone grouping of 1 in zone 1).

FIG. 20 is a diagram illustrating an embodiment of a very high throughput (VHT) long multiple input multiple output (MIMO) control field and feedback field formats for multi-user (MU) and single-user (SU), respectively.

FIG. 21 is a diagram illustrating an embodiment of a codebook information table with 2 bits in the feedback report.

FIG. 23 is a diagram illustrating an embodiment of a VHT MIMO control field.

FIG. 24 is a diagram illustrating an embodiment of tone mapping with grouping.

FIG. 25 is a diagram illustrating an embodiment of a simulation results corresponding to a communication system in which a transmitting wireless communication device has 4 antennae and each of 4 receiving wireless communication devices has a respective 1 antenna.

FIG. 26 is a diagram illustrating an embodiment of per-tone signal to noise ratio (SNR) field in a MU-exclusive beamforming report.

FIG. 27A, FIG. 27B, and FIG. 27C illustrate various embodiments of methods for operating a communication device.

DETAILED DESCRIPTION OF THE INVENTION

Figure 1:
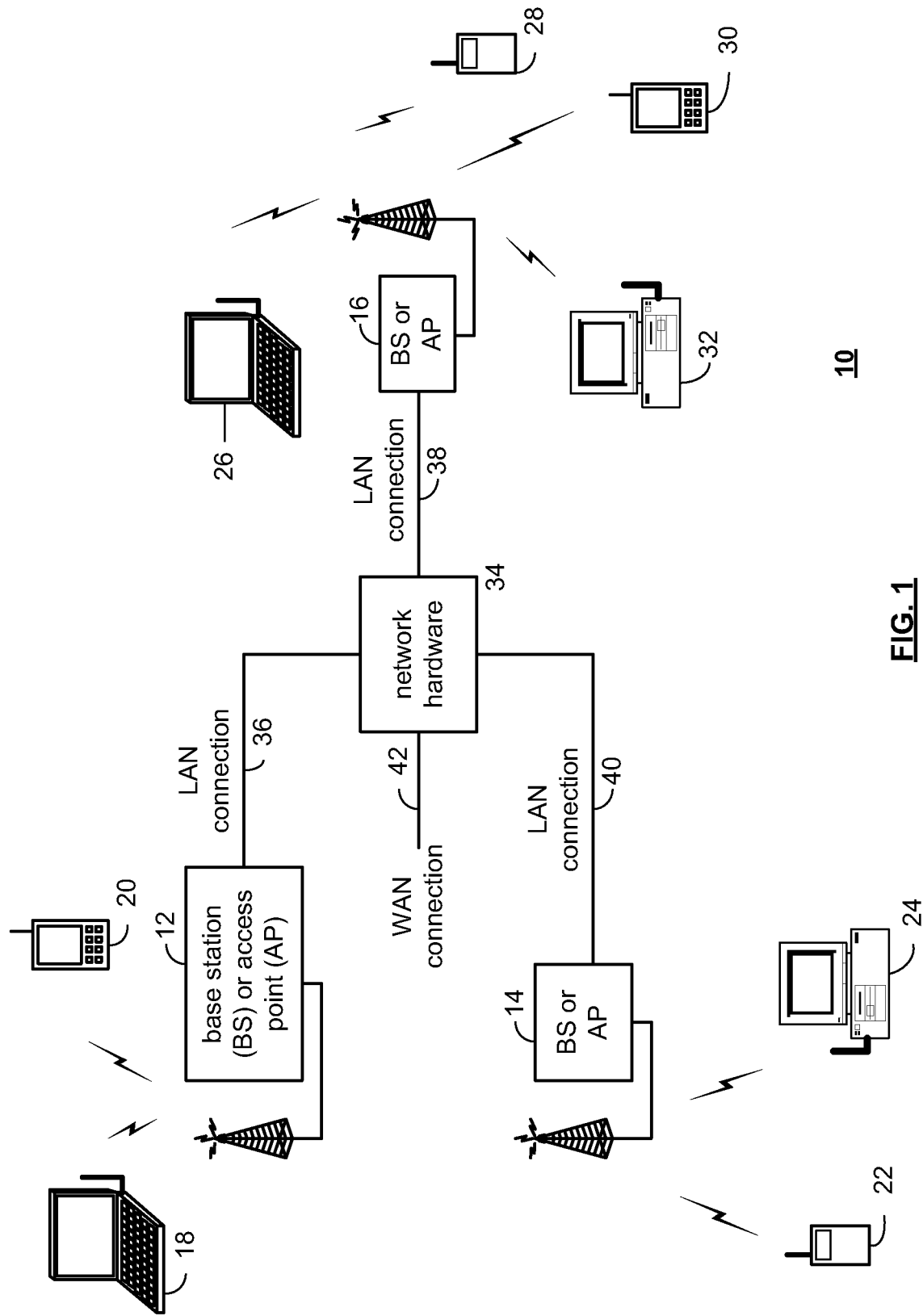
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
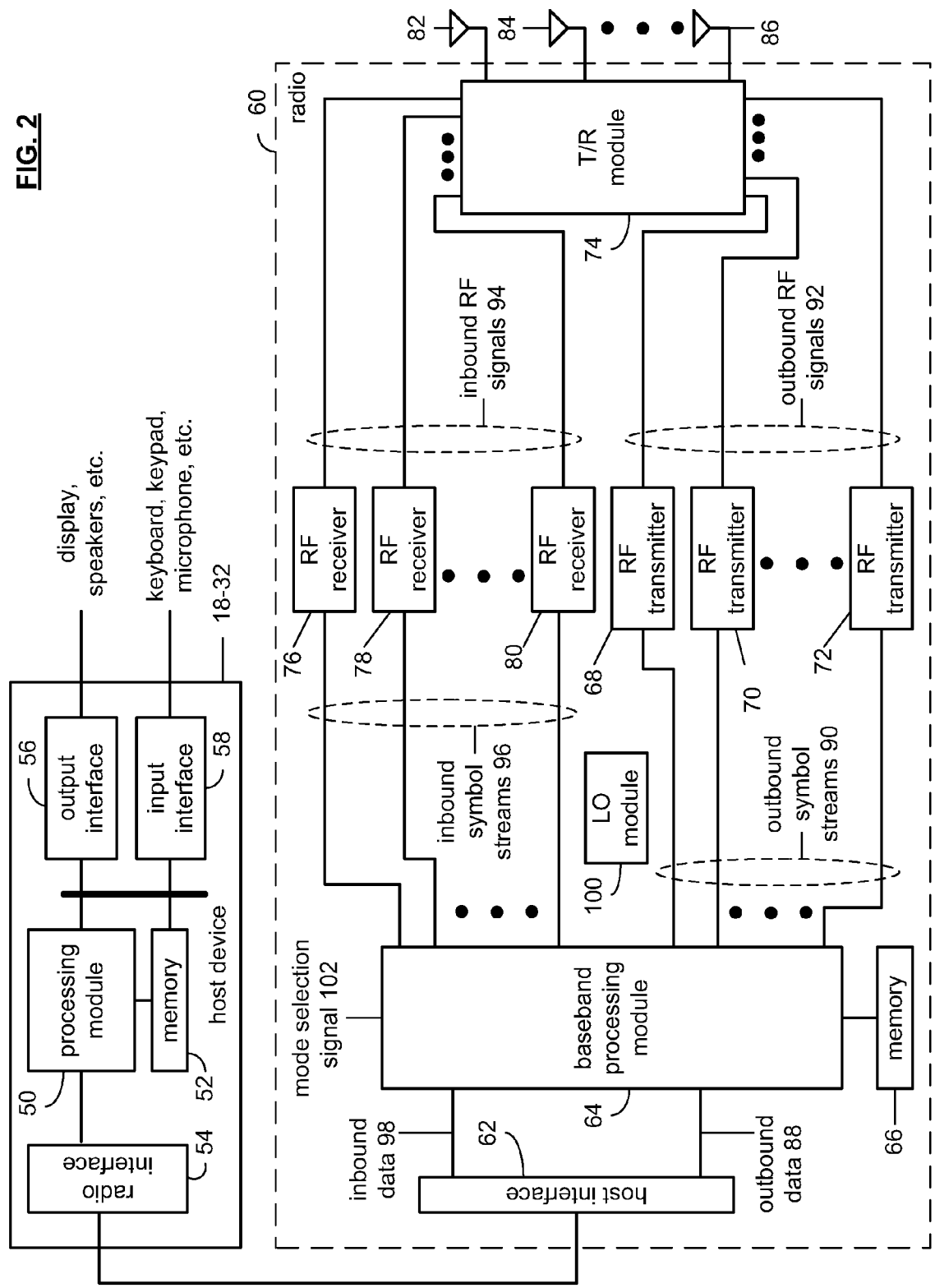
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabitsper-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
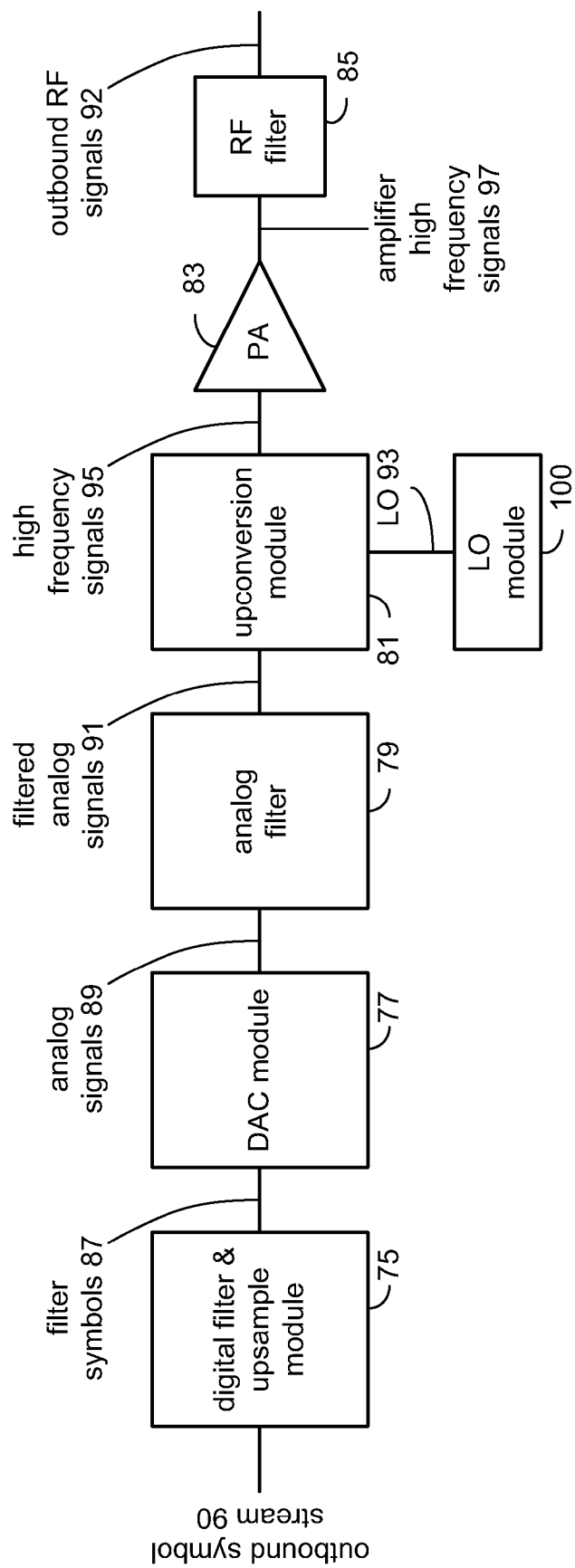
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
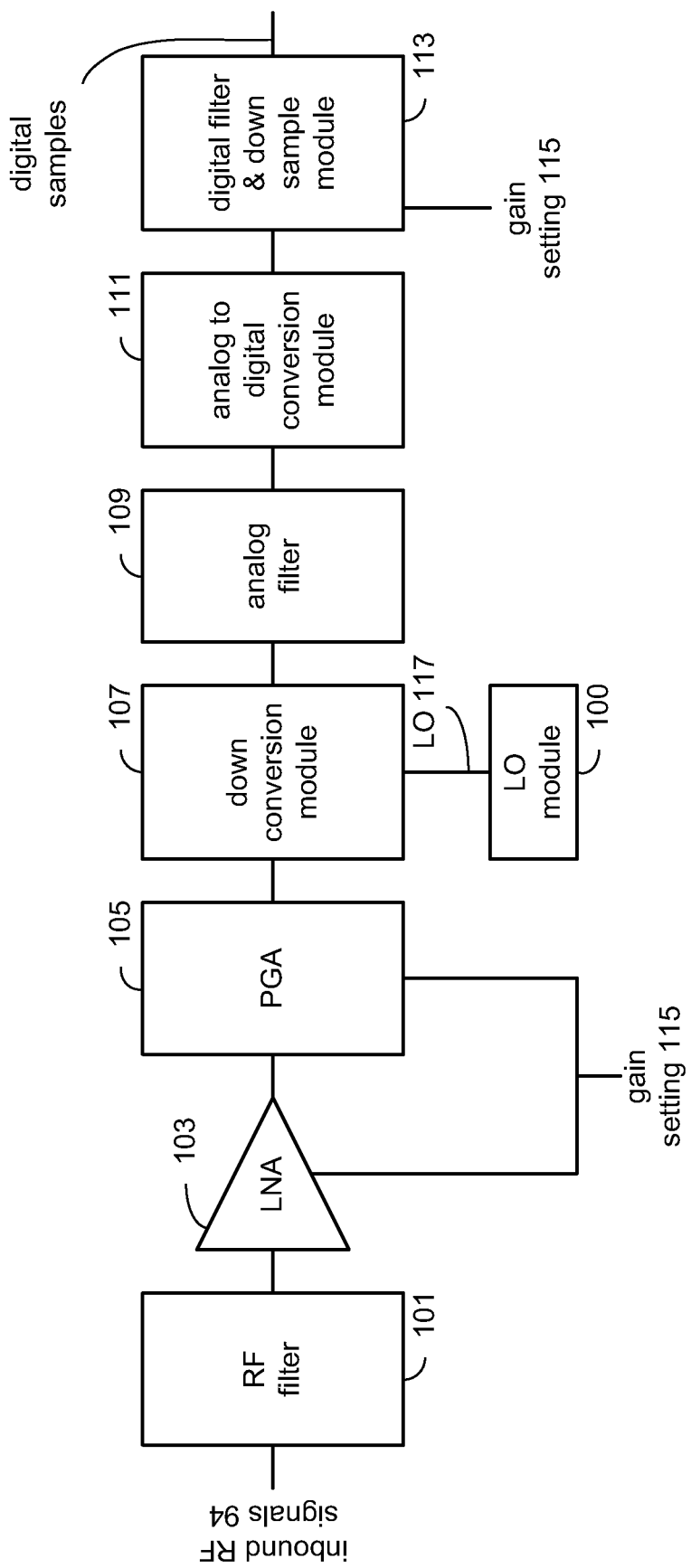
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
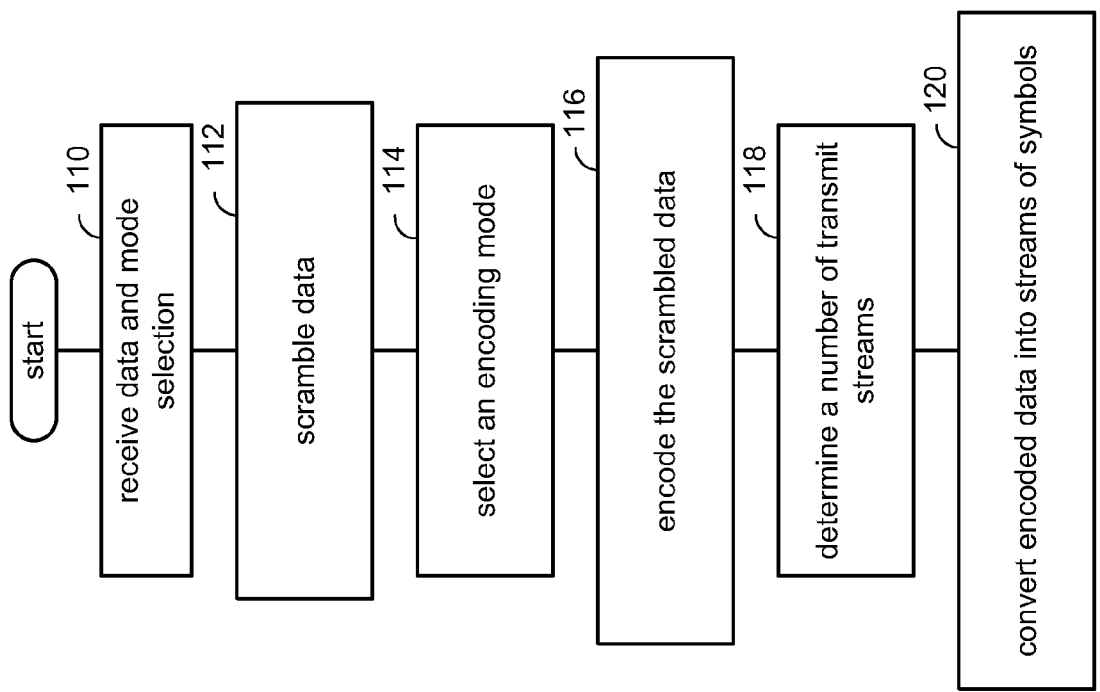
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more of a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
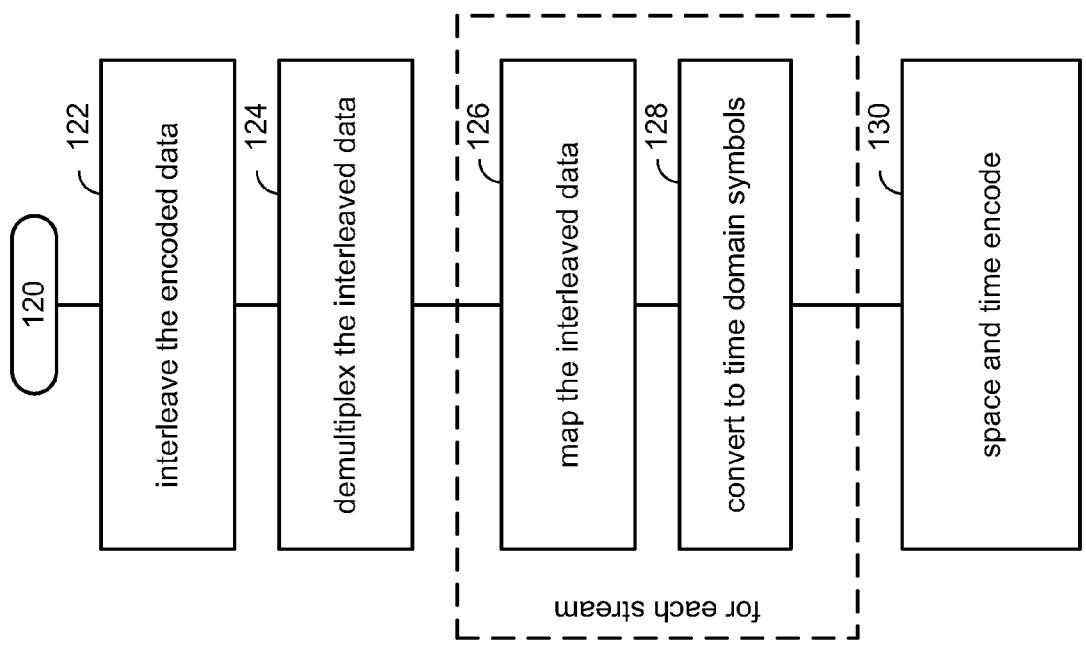
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
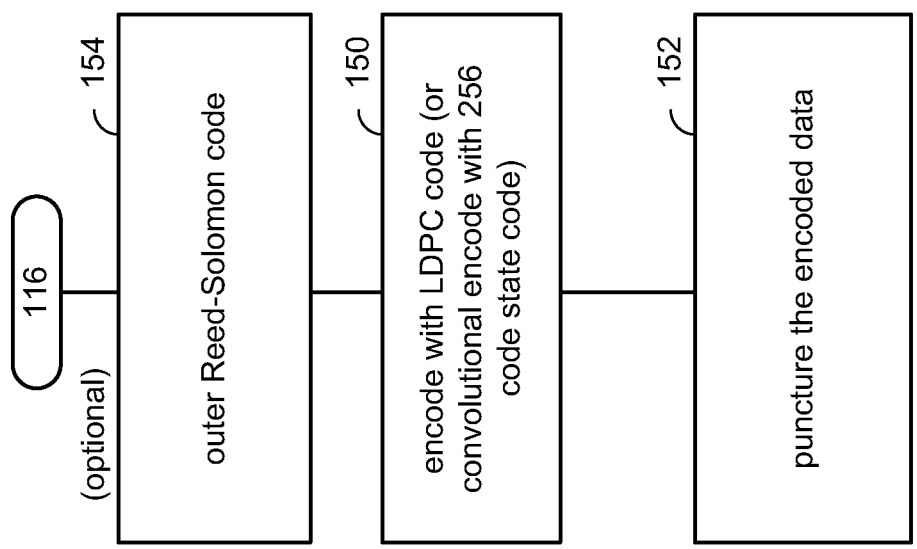
FIGS. 7-9 are diagrams illustrating various embodiments for encoding the scrambled data.
Figure 8:
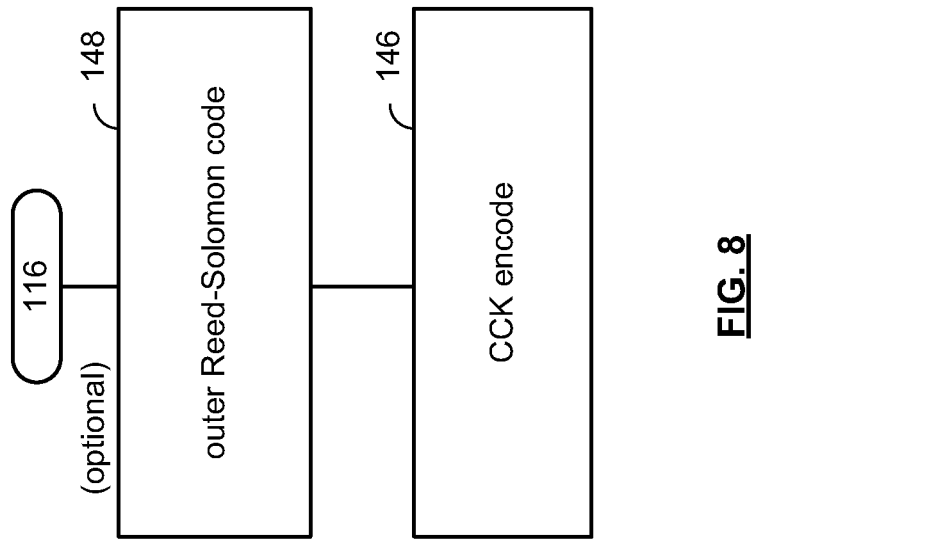
Figure 7:
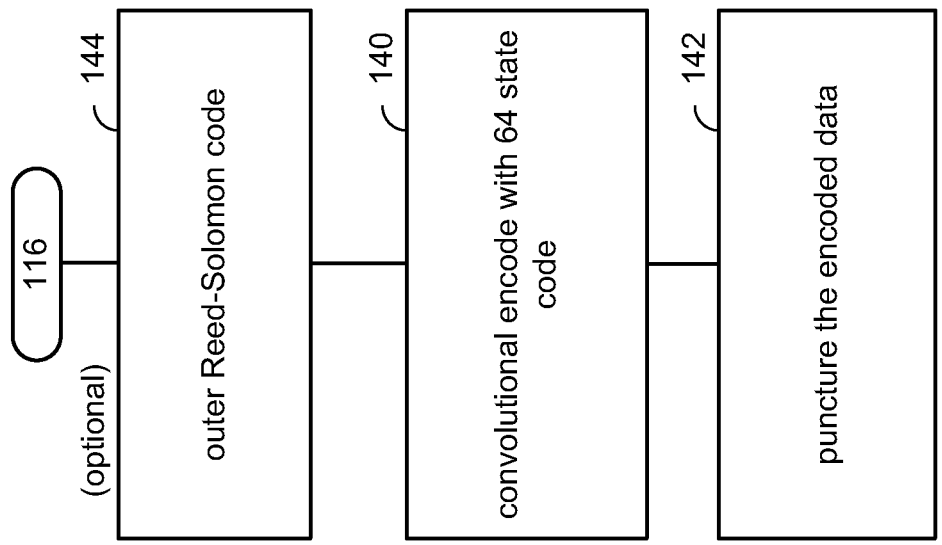

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
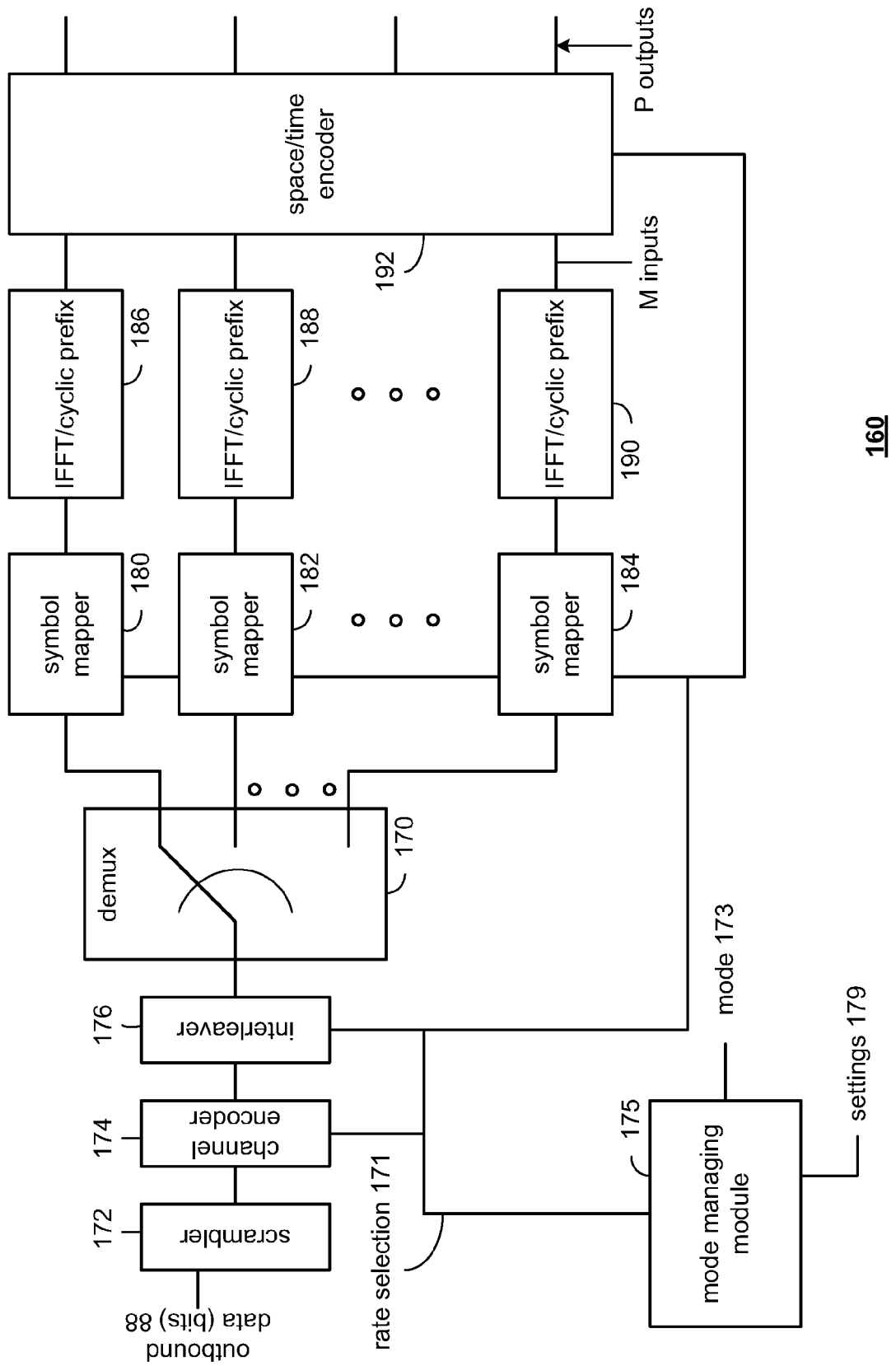
FIGS. 10A and 10B are diagrams illustrating embodiments of a radio transmitter.
Figure 10B:
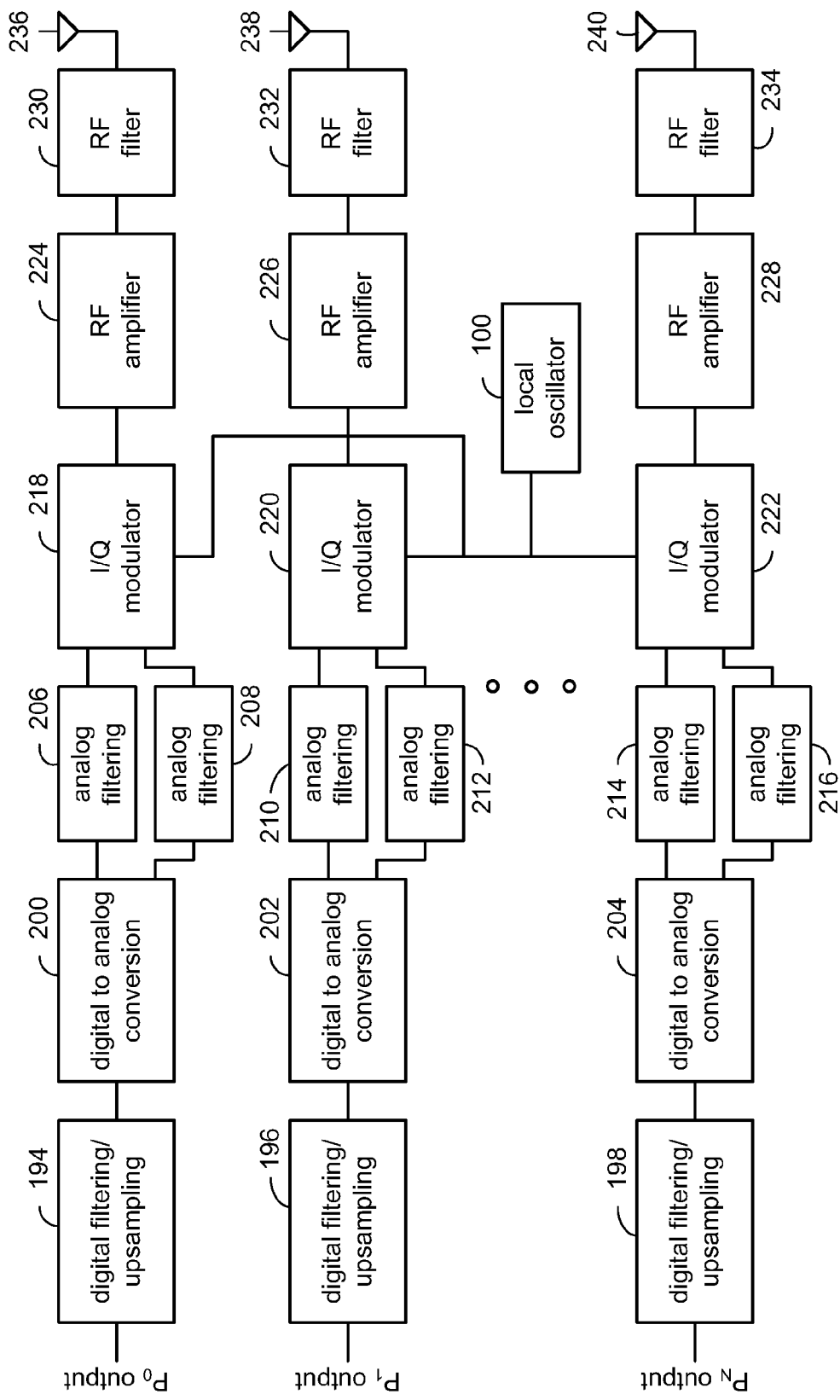

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
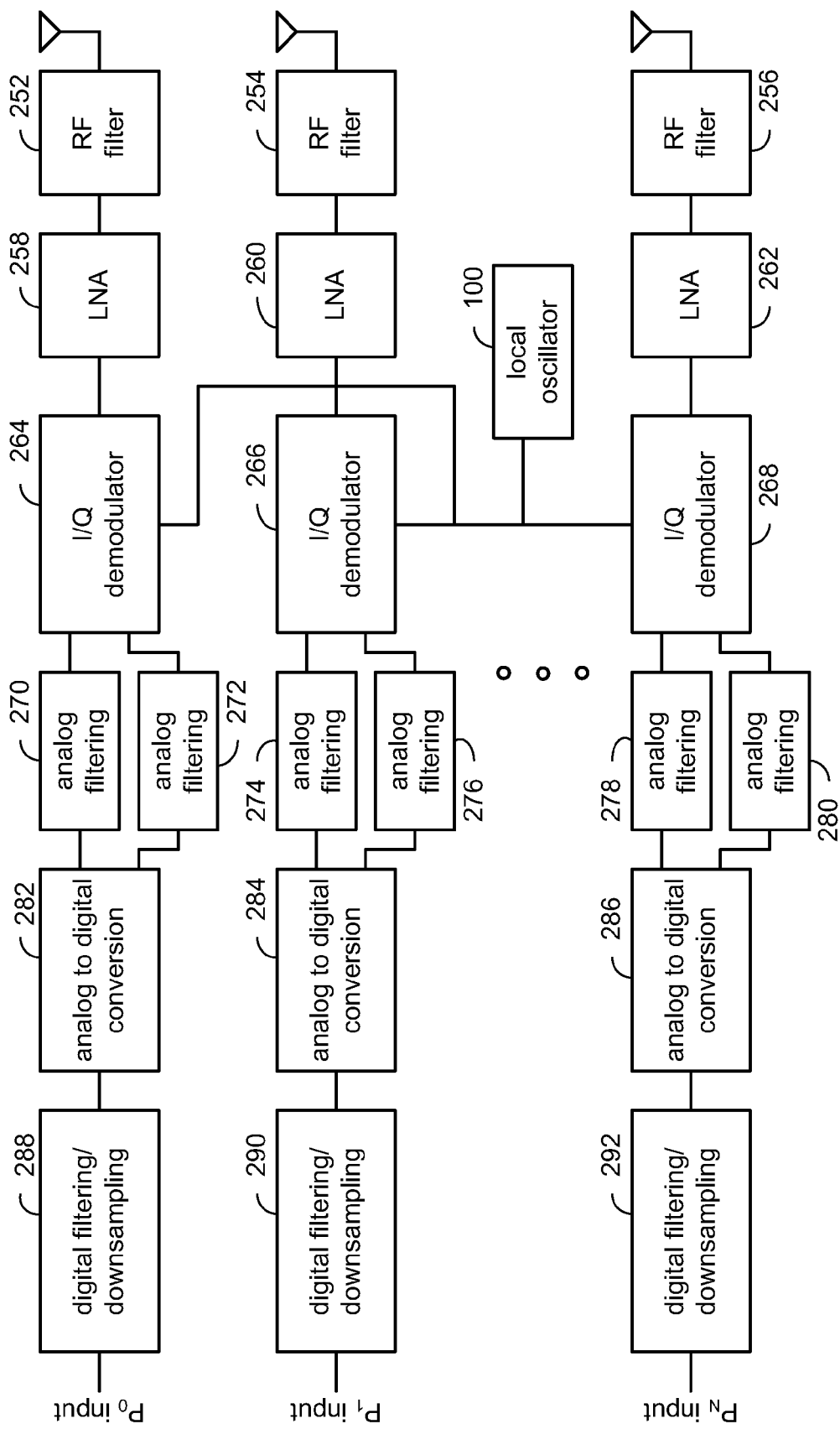
FIGS. 11A and 11B are diagrams illustrating embodiments of a radio receiver.
Figure 11B:
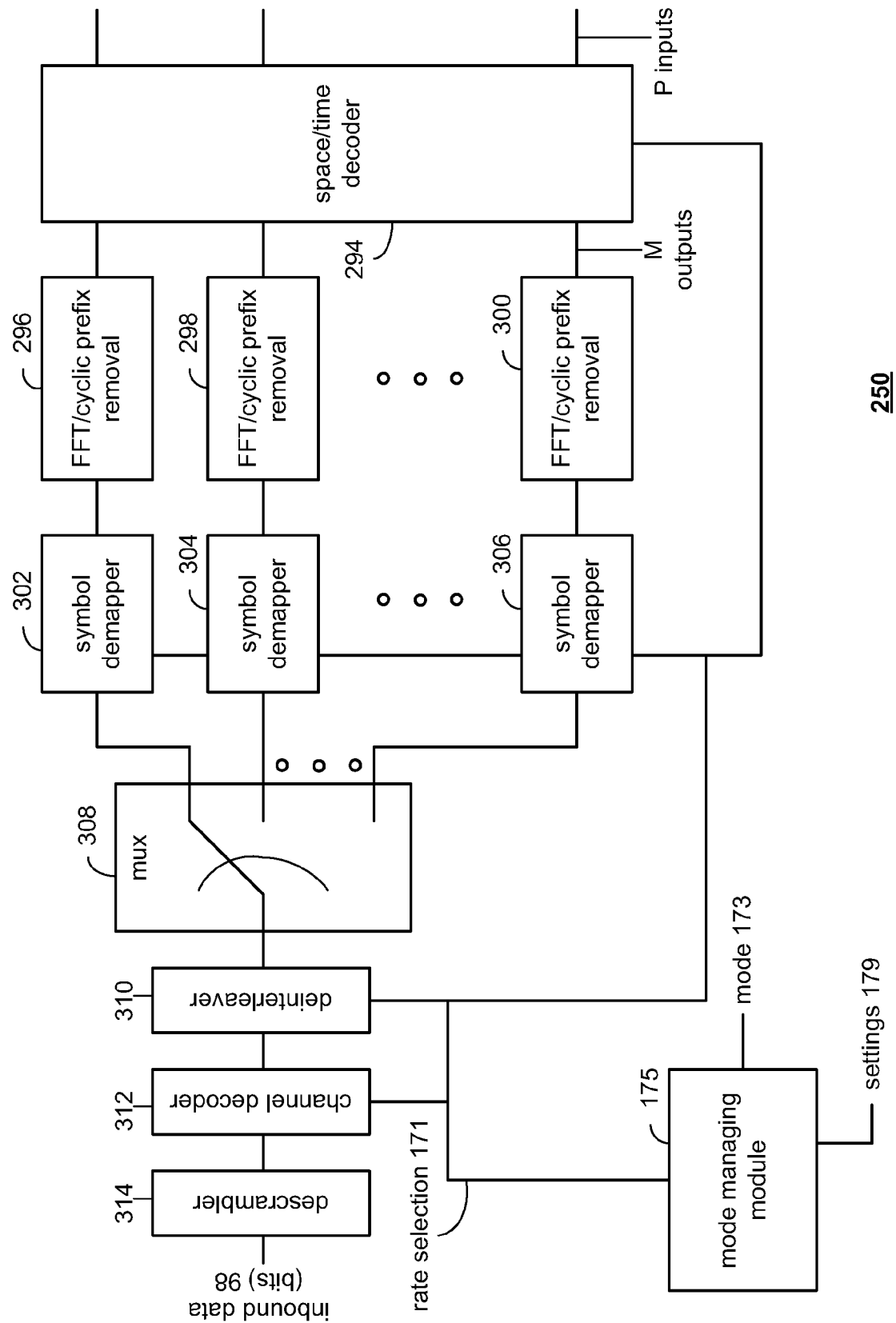

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path. The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
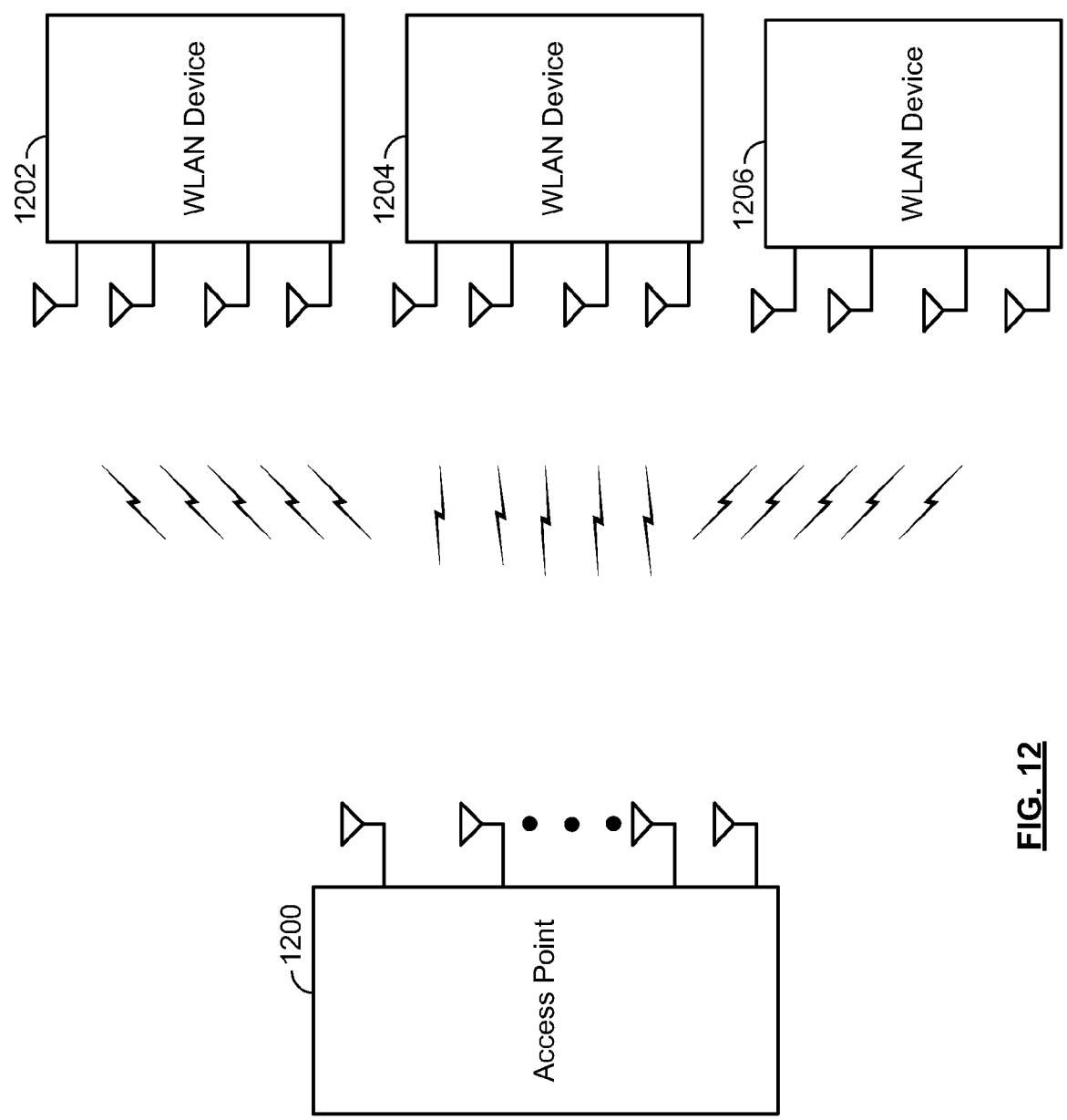
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission. A single MU-MIMO transmission may include spatially-diverse signals over a common set of tones, each containing distinct information and each transmitted to one or more distinct receivers. Some single transmissions may be a combination of OFDMA and MU-MIMO. MIMO transceivers illustrated may include SISO, SIMO, and MISO transceivers. The clusters employed for such communications may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments.

Figure 13:
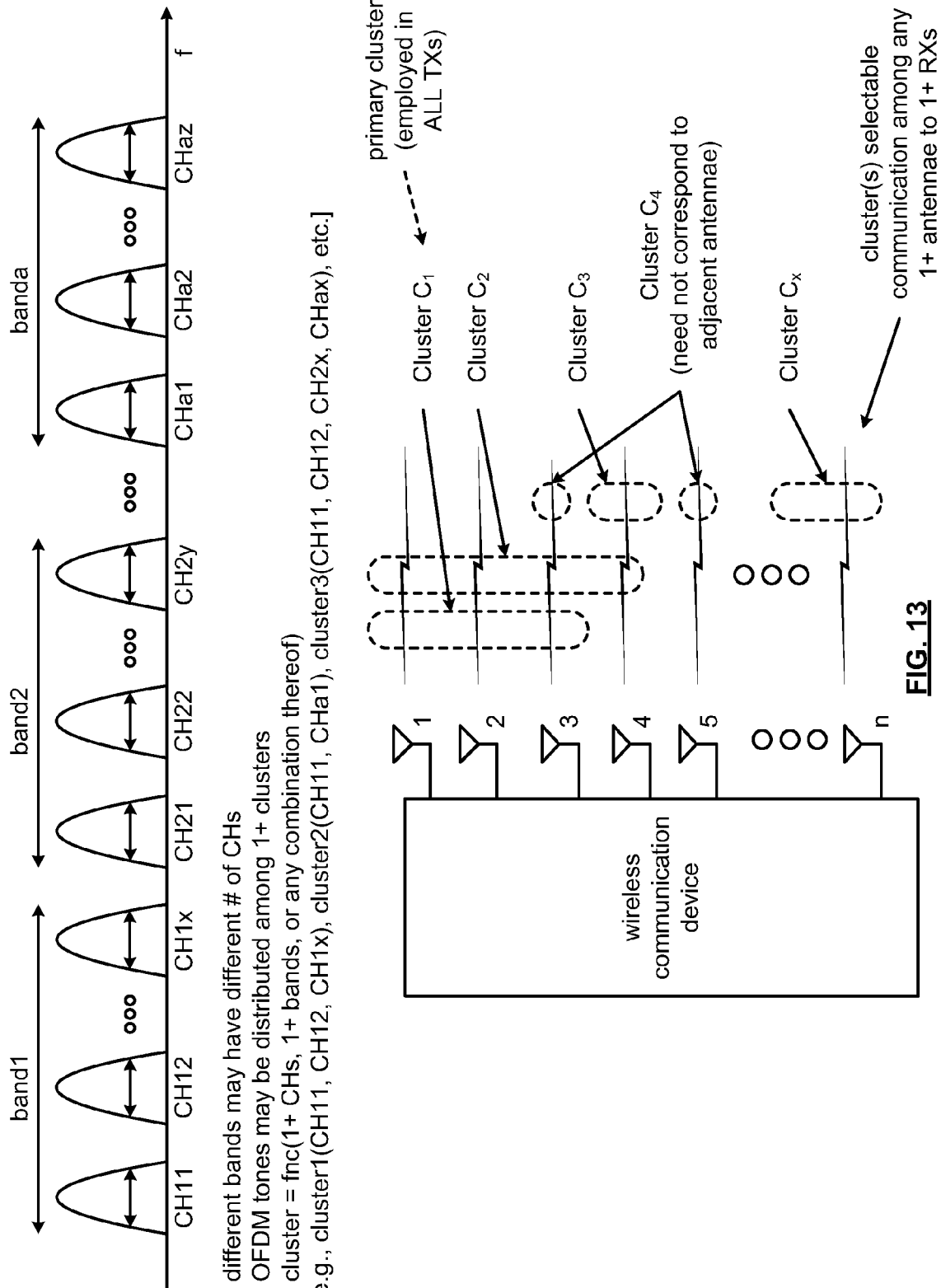
FIG. 13 is a diagram illustrating an embodiment of a wireless communication device, and clusters, as may be employed for supporting communications with at least one additional wireless communication device.
Figure 14:
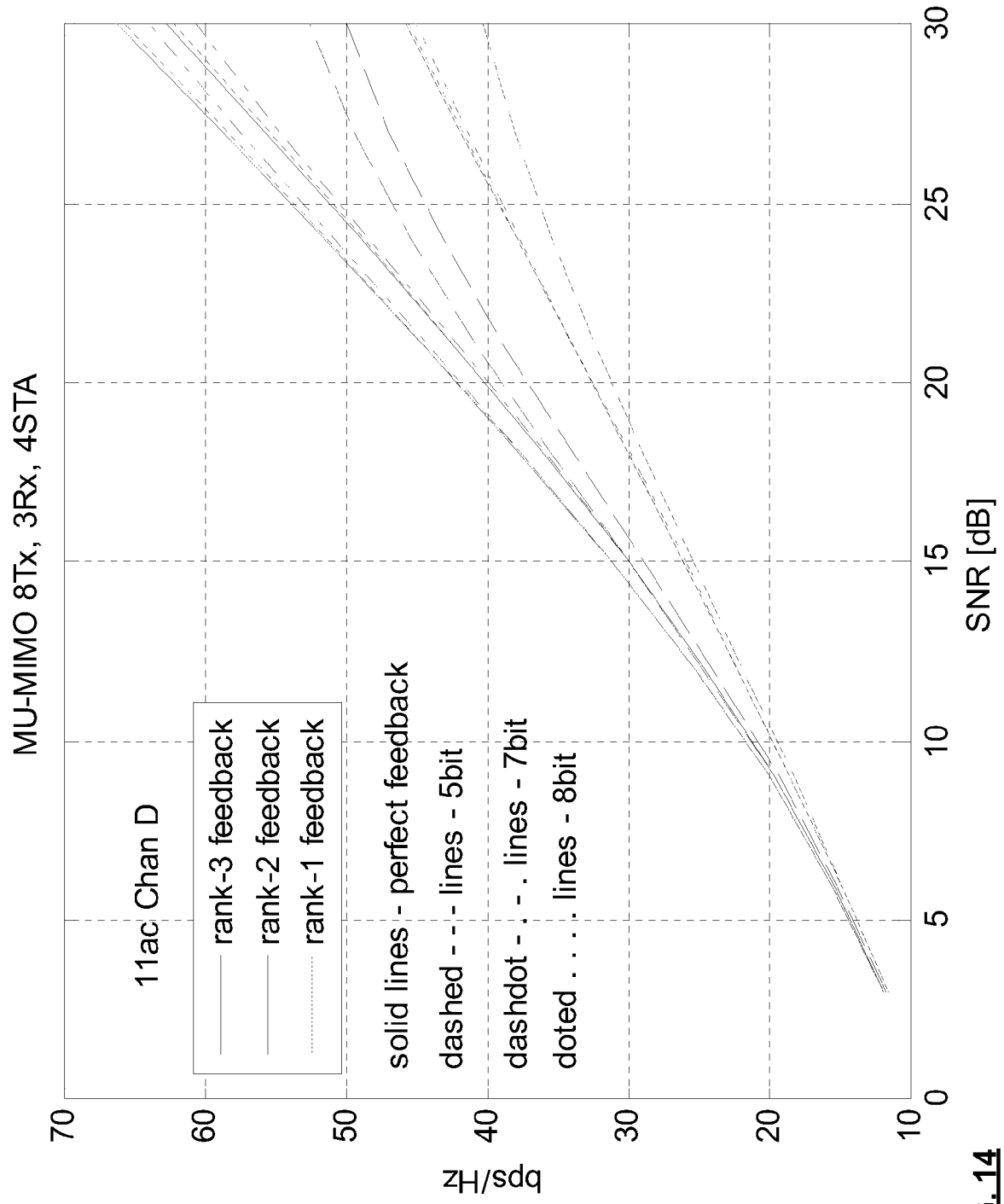
FIG. 14, FIG. 15, FIG. 16, and FIG. 17 are diagrams illustrating various embodiments of simulation results showing the effects of feedback rank and accuracy.
Figure 15:
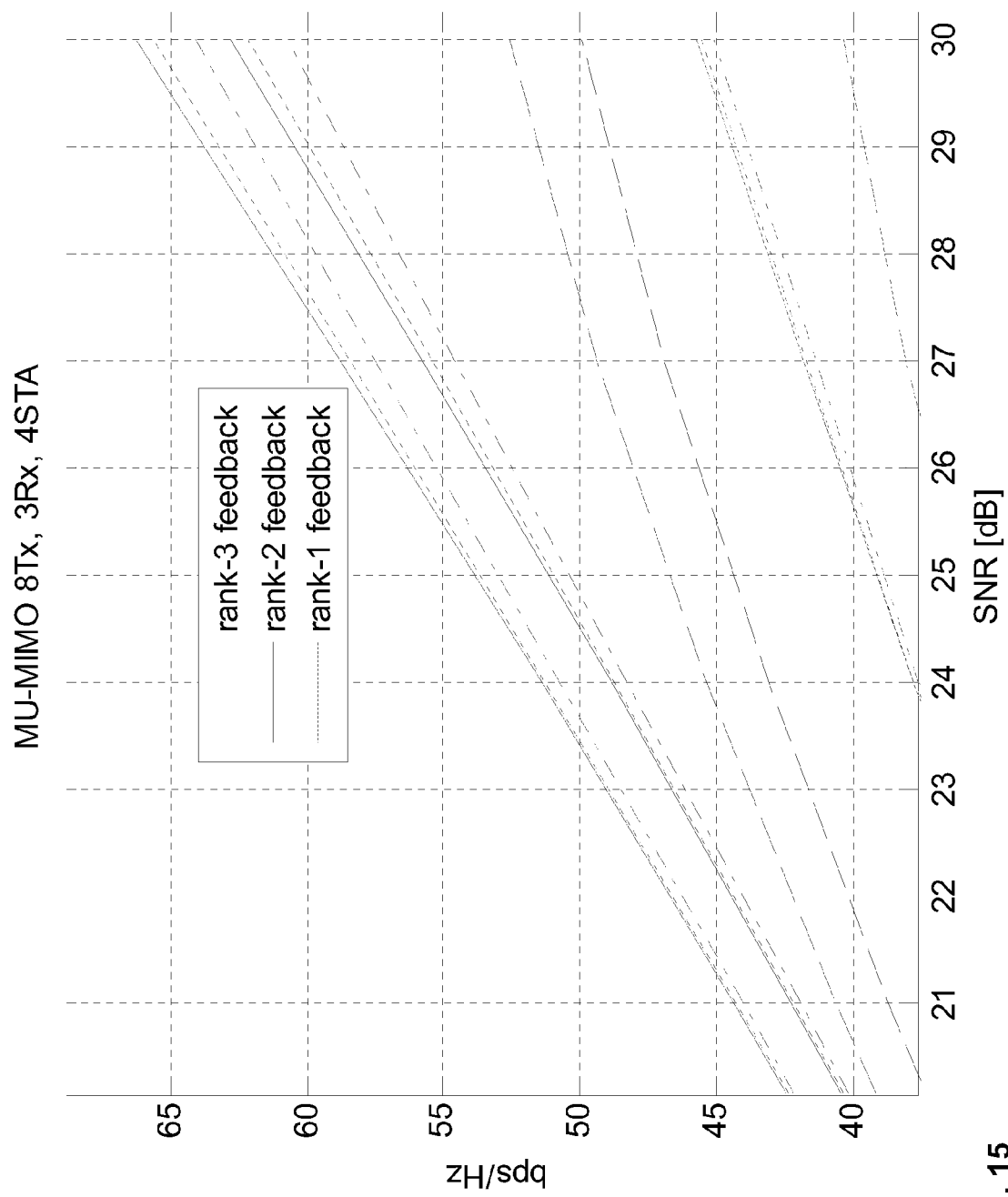
Figure 16:
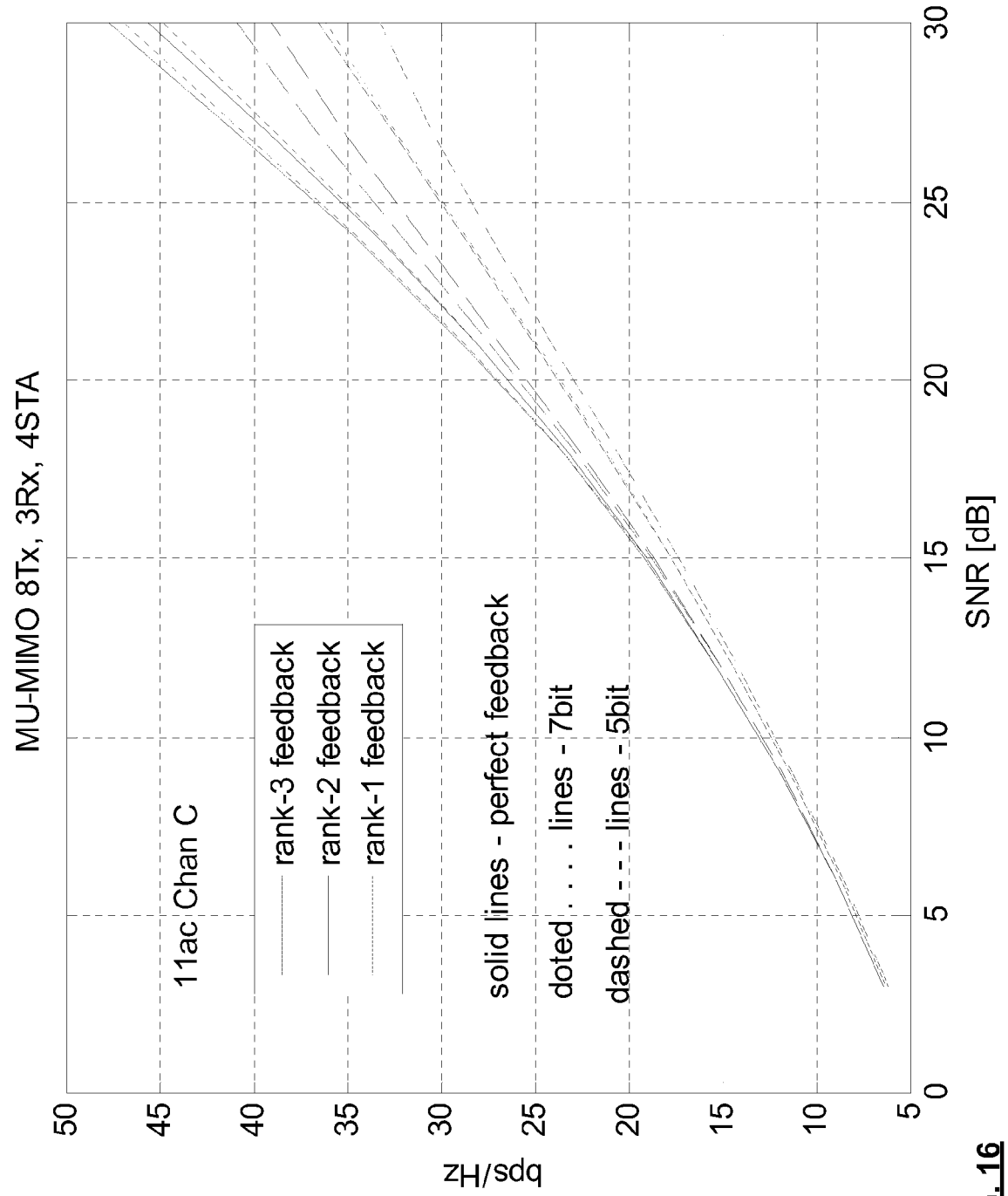
Figure 17:
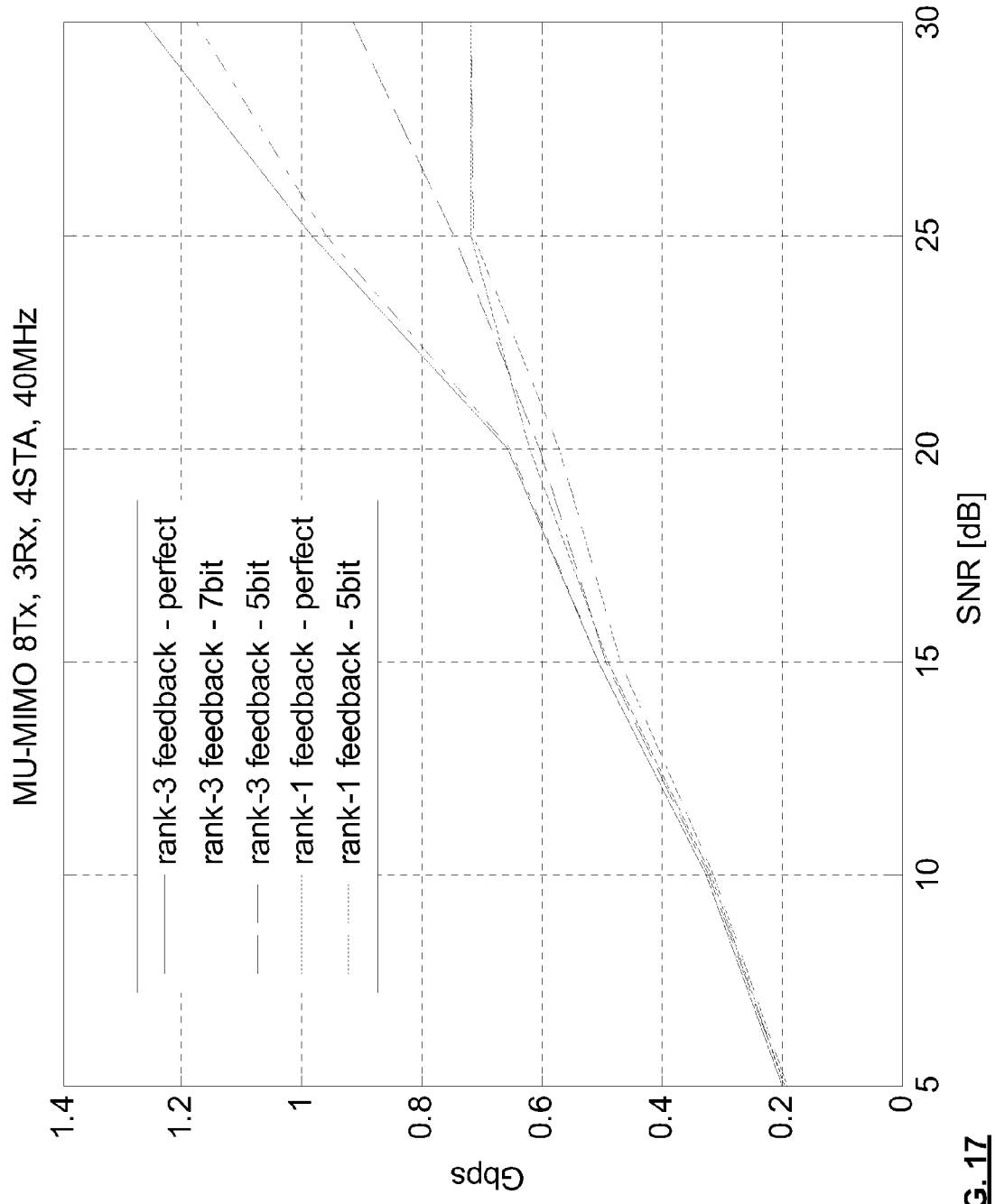

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

One operation that may be performed within certain communication systems involves performing channel estimation of the various wireless communication channels between at least a first wireless communication device and a second wireless communication device. In accordance with such channel estimation, a channel sounding may be transmitted from a transmitting wireless communication device to a receiving wireless communication device; in response to the channel sounding, the receiving wireless communication device may then provide feedback to the transmitting wireless communication device to assist in subsequent beamforming as applied to subsequent communications sent from the transmitting wireless communication device to one or more the receiving wireless communication devices.

Of course, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system.

A novel format for such feedback is presented herein for use in explicit transmit beamforming for subsequent communications sent from the transmitting wireless communication device to one or more receiving wireless communication devices. Such a format as made herein allows for explicit transmit beamforming in accordance with wireless communications compliant with the IEEE Task Group ac (TGac VHTL6).

The format of the feedback employs the compressed V feedback format for single user multiple input multiple output (SU-MIMO). That is to say, for SU-MIMO applications, a common feedback frame format may be employed such as that which is employed for compressed V feedback. In addition, minor extensions may be added to SU-MIMO feedback format to improve and guarantee channel state information quality for multi-user multiple input multiple output (MU-MIMO) transmit beamforming (TXBF).

With respect to the requirements on the feedback information, SU-MIMO and MU-MIMO have different requirements on channel feedback for such TXBF.

With respect to the feedback information as performed and applied in accordance with SU-MIMO, it is important to grant beamformee the flexibility to choose appropriate steering matrices, including the rank of the V matrix (e.g., the beamforming steering matrix, being an $M_T \times M_T$-dimensional steering matrix, where T is the number of transmit antennae, and the matrix V may be obtained from the singular value decomposition (SVD) of the channel matrix). Such transmit beamforming (TXBF) may work well even with less than perfect channel state information in accordance with SU-MIMO applications.

With respect to the feedback information as performed and applied in accordance with MU-MIMO, MU-MIMO is a promising technology aimed at increasing the aggregate network throughput, and in some cases, it can provide for performance that is far above the throughput achievable in accordance with SU-MIMO applications.

It is of course noted that efficient MU-MIMO operation may require more accurate and more complete channel knowledge than is required in accordance with SU-MIMO.

Incomplete and inaccurate channel feedback from one receiving wireless communication device (e.g., a wireless station (STA)) may not only hurt its own respective performance, but such incomplete information may also jeopardize the overall network throughput due to interferences that may be caused within a multi-user (MU) communication system.

A unified feedback format and framework, as constructed in accordance with the novel principles presented herein, may be applied for both SU-MIMO and MU-MIMO communication systems. In other words, a unified feedback format (e.g., accommodating different feedback requirements with one common feedback framework) may be applied to both SU-MIMO and MU-MIMO communication systems thereby avoiding any need for respective and different feedback formats for the two communication system types. As such, a beamformee (e.g., receiving wireless communication device) does not need to implement two separate and different approaches to prepare the feedback information before providing it to the transmitting wireless communication device.

To meet requirements for MU-MIMO, minor extensions may be introduced to SU-MIMO feedback format while operating in accordance with the same feedback framework. The minor extensions may be targeted to focus on extensions that can bring a greatest degree of benefits for MU-MIMO TXBF, and also those that require no additional computations (e.g., thereby conserving hardware resources and budgets).

FIG. 14, FIG. 15, FIG. 16, and FIG. 17 are diagrams illustrating various embodiments of simulation results showing the effects of feedback rank and accuracy. With respect to these simulation results, it can be seen that higher feedback granularity may generally be required to maintain minimal loss at high signal to noise ratio (SNR). Feedback corresponding to those V matrices having the highest rank may not be necessary in all cases. For example, as the size of the V matrices increased as a function of an increase in the number of antennae in such MIMO applications, an acceptable degree of performance may be achieved using those V matrices that have less than the highest rank. For example, in some communication channels exhibiting lower angular spread, feedback associated with a lower rank (e.g., rank-1 feedback) may provide adequate and acceptable performance. It is also noted that, in certain embodiments, it may be preferable to allow the transmitting wireless communication device (e.g., an Access point (AP)) to request the rank corresponding to the feedback V matrix and the desired accuracy in order to provides for a better or best trade off that the feedback overhead with downlink (DL) performance.

A novel approach for the format to be employed in accordance with explicit feedback format, as applicable to both SU-MIMO and MU-MIMO communication system applications.

In accordance with one embodiment, one bit may be added in a non-data packet announcement (NDP-A) frame (e.g., such as that which may precede and indicate a subsequent channel sounding) to indicate feedback in accordance with either SU-feedback or MU-feedback (e.g., such as described in reference [4]). For example, this one bit being set to a value of 0 may indicate SU-MIMO feedback operation, and the one being set to a value of 1 may indicate MU-MIMO feedback operation, or vice versa.

For SU-MIMO applications, the explicit feedback format may operate in accordance with the same compressed V feedback format described in Sections 20.3.12.2.5 and 7.3.1.29 of IEEE 802.11n-2009 with certain straightforward extensions (e.g., as described below with respect to the APPENDIX) for wireless communication devices employing from 5 up to 8 transmit/receive (TX/RX) antennae.

For MU-MIMO applications, the explicit feedback format may be slightly adapted to add certain of the following extension to the compressed V feedback format described in accordance with IEEE 802.11n.

One of the possible extensions involves adding per-tone eigen-values (e.g., corresponding to the V matrices). This could also be extended to per-sub-band eigen-values (e.g. each 20 MHz sub-band share a set of common eigen-values) to save or reduced feedback overhead. That is to say, a compressed beamforming feedback frame may be employed that includes a number of per-tone or per-sub-band eigen-values corresponding to the respective V matrices, associated with a feedback frame, that are employed by a beamformer to calculate the appropriate steering matrices for subsequent transmissions from the beamformer (e.g., a transmitter) to a beamformee (e.g., a receiver).

Another of the possible extensions involves increasing quantization resolutions of the feedback information. This may operate to increase the codebook information field in the MIMO control field (e.g., modify/increase such a field such as with respect to FIGS. 7-36j within the IEEE Std 802.11n™-2009, which is incorporated by reference above) up to 3 bits to accommodate higher accuracy quantization. For example, by employing up to three bits, as many as eight different values could be represented. For instance, a channel bandwidth may be indicated within a MIMO control channel width field adaptive for indicating more than two different channel widths. For example, as described with respect other embodiments herein, various channel widths may be employed for communications including those being 20 MHz, 40 MHz, 80 MHz, and 160 MHz. By employing more bits, an increased number of channel widths may be represented. For example, if only one bit is employed, then only to possible channel widths may be represented (e.g., having the bit set to one value for one channel width and having the bit set to another value for another channel width). By employing additional bits, at least three (e.g., more than two) separate and distinct channel widths may be represented. In one embodiment, if two bits are employed, then up to four different channel widths may be represented. In another embodiment, if three bits are employed, then up to eight different channel widths may be represented. Generally speaking, if additional bits are employed, then greater number of separate and distinct channel widths may be represented within a MIMO control channel width field.

Yet another of the possible extensions involves having the beamformer (e.g., transmitting wireless communication device such as an AP) request a certain feedback rank of the V matrix. The request can be indicated in an NDP-A frame transmitted from a transmitting wireless communication device. A receiving wireless communication device that receives an NDP-A frame may process that received frame to determine a requested feedback rank of a steering matrix that the transmitting wireless communication device would prefer. In such an instance, the receiving wireless communication device may be viewed as being a beamformee and the transmitting wireless communication device may be viewed as being a beamformer. In accordance with generating a compressed beamforming feedback frame, such a receiving wireless communication device/beamformee may generate such a compressed beamforming feedback frame in accordance with the requested feedback rank as indicated and requested by the transmitting wireless communication device/beamformer.

A compressed beamforming approach is being employed herein in accordance with the development of technology for channel feedback in ACcord (e.g., IEEE 802.11ac). Herein, various further details are presented for use in accordance with such development.

Angle Resolution

Figure 18:
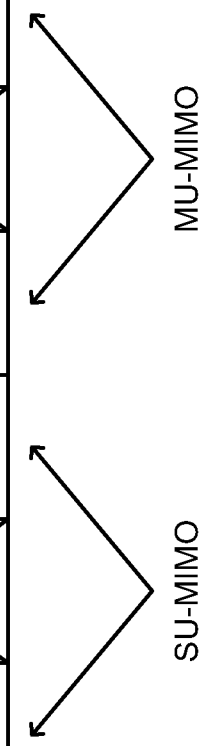
FIG. 18 is a diagram illustrating an embodiment of an angle resolution table.

FIG. 18 is a diagram illustrating an embodiment of an angle resolution table. It has been observed in multi-user (MU) simulations that average angle ($\phi$ and $\psi$) quantization of 8 bits is required to achieve practically no loss of throughput. It has also been observed in SU simulations employing wireless communication devices with 8 antennas that an increase of resolution to (5,7) may be useful. Herein, an increase to the codebook information table is made thereby extending to 3 bits and adding the following resolutions (b$\psi$, b$\phi$)={(5,7), (6,8), (7,9), reserved. As such, the angle resolution table is as show in the diagram. In a preferred embodiment, certain of the resolutions may be employed for SU-MIMO, and other of the resolutions they be employed for MU-MIMO. Depending upon an operational mode being employed within a given wireless communication system and/or by a given wireless communication device (e.g., such as operating in accordance with SU-MIMO or MU-MIMO), different respective angle resolution values may be included within a given compressed beamforming feedback frame. As can be seen in the lower part of the diagram, certain selected angle resolution values correspond to SU-MIMO, and other selected angle resolution values correspond to MU-MIMO.

Tone Grouping

Uniform sampling of the frequency domain is typically employed and allows simple and efficient interpolation schemes. As such, certain embodiments presented herein that are directed towards and applicable for applications related to IEEE 802.11ac operate using a baseline uniform tone grouping with options 1, 2 and 4 as recommended in reference [6]. However, typical interpolation schemes may suffer performance loss at the band edge. One approach by which performance may be improved is to increase the tone density at the band edge. While some embodiments presented and described herein operate in accordance with seeking to improve tone density advantages, employing non-uniform sampling of the frequency domain, etc., it is nonetheless noted that many embodiments operate using uniform sampling of the frequency domain.

The performance improvement will depend on the channel delay spread, specific interpolation scheme, signal bandwidth (e.g., 20 MHz, 40 MHz, 80 MHz, etc.), and the accuracy of the feedback information.

Extensive simulation results for various MIMO configurations have been performed with respect to variants of channel bandwidth, number of added tones at the band edge, etc. Herein, certain embodiments propose to add a certain flexibility to allow a transmitting wireless communication device (e.g., an access point (AP)) to request increased tone density from the various receiving wireless communication devices (e.g., STAs).

In addition, the baseline tone mapping may be augmented with the following signaling in the MIMO control field. Three (3) zones may be defined based on the requested tones in the baseline mapping as follows:

Zone 1—from the outermost tone (on both edges of the BW) to the second outermost Zone 2—from second outermost tone to the third outermost Zone 3—from the first tone near DC to the second (on both sides of DC)

If the baseline tone grouping requested is 4, then the transmitting wireless communication device (e.g., AP) can request tone grouping 1 or 2 in each of the zones. If the baseline is 2, then the transmitting wireless communication device (e.g., AP) can request tone grouping of 1.

In addition, the following bits may be added:
  1 bit to signal whether the AP requests added tones—can also use the reserved value in the current grouping field
  3 bits to signal the requested increased density in each of the 3 defined zones.

Each bit means:
  If baseline tone grouping is 4—1 means tone grouping 2, 0 means tone grouping 1
  If baseline tone grouping is 2—1 means tone grouping 1

FIG. 19 is a diagram illustrating an embodiment of a tables respectively showing resulting fed back tones with different baseline tone grouping, and particularly, showing tone grouping 2 (with added tone grouping of 1 in zones 1 and 2) and tone grouping 4 (with added tone grouping of 1 in zone 1). The tables in this diagram show the resulting fed back tones with different baseline tone grouping and respectively with:

Tone grouping 2—added tone grouping of 1 in zones 1 and 2

Tone grouping 4—added tone grouping of 1 in zone 1

Per-Tone-SNR for MU-Type Feedback

It has been observed in simulations that providing per-tone-SNR is especially useful with tone grouping of 4 and with partial rank feedback. As such, various embodiments presented herein include providing per-tone-SNR related feedback. In addition, it is proposed to add a new field to define the feedback of per-tone-SNR for each space time stream.

Also, it is proposed to define the per-tone-SNR for each space time stream as the deviation in dB relative to the fed back average SNR per space-time stream (1 to Nc).

The new sub-field has additional 4×Nc bits per tone:
  Feedback granularity is 1 dB. Feedback range −8 to 7 dB with 4 bits for each space-time stream
  This new sub-field is added in Compressed Beamforming Report field.

Whether the report field includes per-tone-SNR depends on the SU/MU-type feedback request by the beamformer (e.g., the transmitting wireless communication device (e.g., AP)).

Interpolation

With tone grouping >1, the beamformer (e.g., transmitting wireless communication device (e.g., AP)) may perform interpolation across frequency. However, since the channel feedback is based on feedback of the eigen-values and eigen-vectors {S,V}, normal interpolation methods that assume smoothness of the channel will typically fail to provide adequate results due to discontinuity of the singular vectors V from one tone to another.

Therefore, artificial smoothing may be used to reconstruct an artificially smooth channel before interpolation takes place. For example, very good performance is achieved by creating Hi=UiSiVi' where the pair {Si,Vi} is the fed back information for tone (subcarrier) i and Ui is found as follows:

[uu,ss,vv]=SVD(HkViSi)

Ui=uu*vv'

The operator ( )' is the conjugate transpose of a matrix and SVD is the singular value decomposition. The subscripts k and i denote two adjacent subcarriers from the list of fed back tones. Hk was the channel found in the previous iteration.

The approach starts from a tone at one end of the bandwidth and creates H1=S1V1' and then progresses across the fed back tones one by one to create a channel which is smooth relative to the previous one: Hi=UiSiVi' where Ui was found using the previously generated Hk and the pair {Si,Vi}.

After an artificially smooth channel Hi has been created, several known interpolation schemes can be used such as linear interpolation or FFT smoothing. For example, FFT smoothing is a very good interpolation algorithm and is described as follows:

The frequency domain channel is multiplied by a window such as a Hamming window to reduce band edge effects. The result is converted to time domain via IFFT. The first N samples in the time domain are kept and converted back into frequency using FFT.

N can be determined based on the channel delay spread

The resulting frequency domain samples are multiplied by the inverse of the window to restore the original amplitudes. Some of the tones at the edge are replaced by the added tones that were fed back as described above (e.g., with respect to augmenting the baseline tone mapping with various signaling in the MIMO control field).

FIG. 20 is a diagram illustrating an embodiment of a very high throughput (VHT) long multiple input multiple output (MIMO) control field and feedback field formats for multi-user (MU) and single-user (SU), respectively. In accordance with the various novel solutions presented herein that may be employed in accordance with various implementations of the IEEE 802.11ac standard (e.g., ACcord), the feedback frame for both single-user (SU) and multi-user (MU) as Action-No-Ack frame based on section 7.4.10.8. Herein, the following VHT MIMO Ctrl Field and feedback report field formats are proposed for multi-user (MU) and single-user (SU).

FIG. 21 is a diagram illustrating an embodiment of a codebook information table with 2 bits in the feedback report.

Angle Resolution

It has been observed in MU simulations that average angle ($\phi$ and $\psi$) quantization of 6 (or more number of) bits for 4 Tx and 7~8 bits for 8 Tx is required to achieve practically no loss of through this put, as described in references [7, 11, 12]. It is shown for SU-MIMO that average angle quantization of 3~4 bits is typically used with 2 to 4 transmit (Tx) antennae [7]. An additional bit may be appropriately added for wireless communication devices using 8 transmit (Tx) antennae. As such, the codebook information table depicted in the diagram with 2 bits in the feedback report is suggested.

Figure 22:
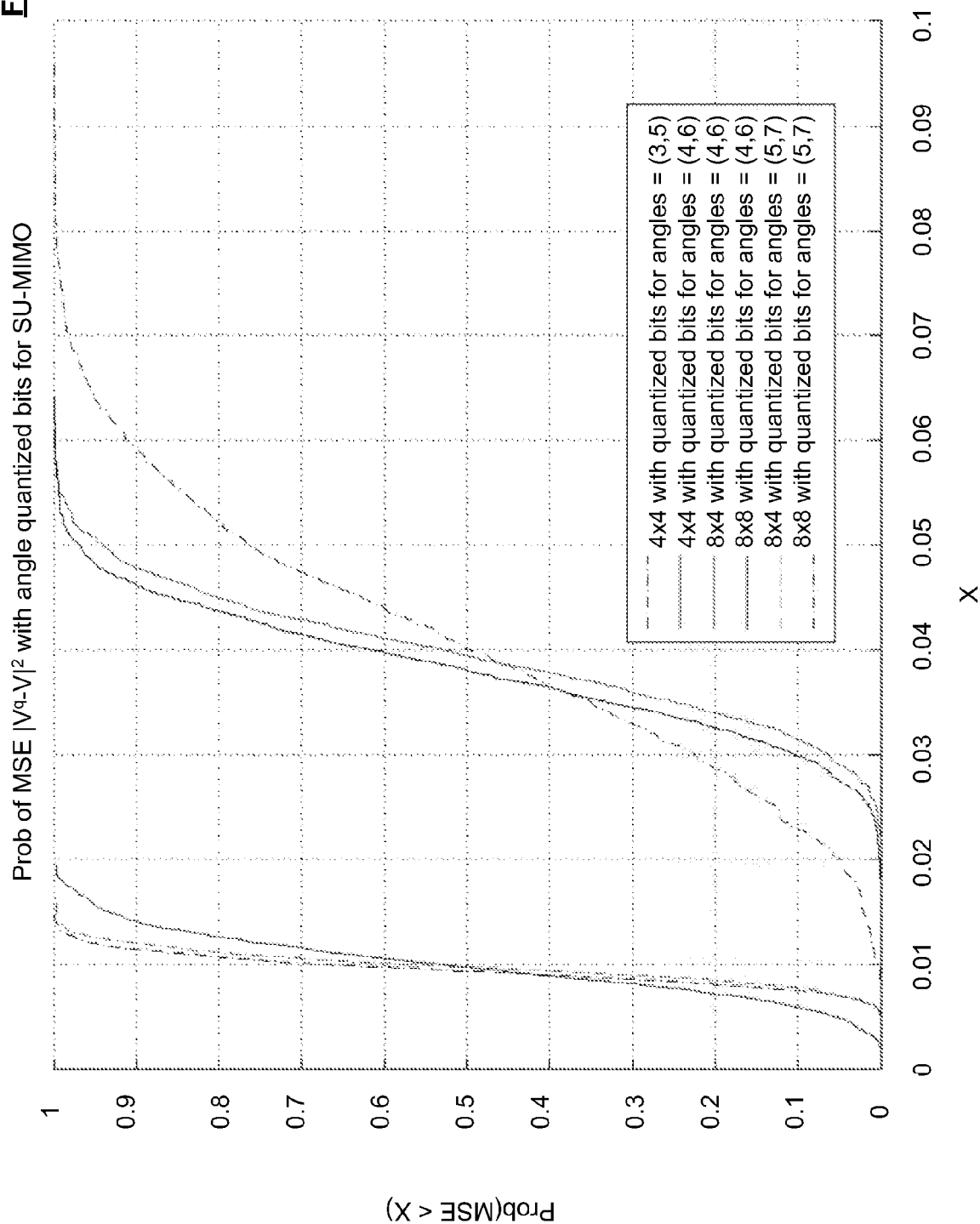
FIG. 22 is a diagram illustrating an embodiment of a simulation for SU with 8 transmit antennae.

FIG. 22 is a diagram illustrating an embodiment of a simulation for SU with 8 transmit antennae. This simulation is for a 4×4 configuration in an IEEE 802.11n communication system (as the worst case), packet error rate (PER) simulation show that (3,5) bit resolution is good enough to achieve within a few fractional dB from PER with floating point feedback (full resolution) as described in reference [7]. For an embodiment including an 8 transmit (Tx) antennae configuration, one more bit per angle may be employed in order to ensure no loss of performance loss due to quantization error.

FIG. 23 is a diagram illustrating an embodiment of a VHT MIMO control field. The fields that are common for both SU and MU operational modes are as shown in the diagram and as follows:

MU→0: SU feedback (FB)

1: MU FB

Nc: 0~7 correspond to 1~8 columns

Nr: 0~7 correspond to 1~8 rows

BW→0: 20 MHz

1: 40 MHz

2: 80 MHz

3: 160 MHz

Ng→0: Ng=1 1: Ng=2 2:Ng=4

Codebook Information:

When operating in SU Mode (e.g., when MU-type bit is not set)

0: Reserved

1: (2,4)

2: (3,5)

3: (4,6)

When operating in MU Mode (e.g., when MU-type bit is set)

0: Reserved

1: (5,7)

2: (6,8)

3: (7,9)

Sounding Sequence Number

Fields that are valid only for the MU Mode may be defined as desired and appropriate for a given embodiment.

Tone Grouping

FIG. 24 is a diagram illustrating an embodiment of tone mapping with grouping. Uniform sampling of the frequency domain may be employed thereby allowing simple and efficient interpolation schemes. It is proposed that the IEEE 802.11ac then utilizes a baseline uniform tone grouping with options 1, 2 and 4 as recommended in [9].

However, interpolation schemes may suffer performance loss at the band edge. As such, tone density may be compensated at the band edge to counter such deleterious effects. The performance improvement will depend on the channel delay spread, specific interpolation scheme, signal bandwidth and accuracy of the feedback, etc.

Extensive simulation results have been performed for various MIMO configurations including variations of channel bandwidth and number of added tones at the band edge; it is also proposed to add a certain flexibility to allow the transmitting wireless communication device (e.g., AP) to request the increased tone density.

Tone Mapping with Grouping

The tables depicted in the diagram show the resulting fed back tones with different baseline tone grouping and with possible tone augmentation at the band edge and around DC:

80+80 MHz has the same pattern with 80 MHz tone mapping below for each band.

For contiguous 160 MHz, tone mapping for 80 MHz is shifted by ±128 tones.

Basically, when tone augmentation is not used, tone mapping with grouping of 2 and 4 starts at tone edge and ends at the lowest tone near DC for both negative/positive tone range, excluding null tones.

In accordance with the existent operation of ACcord (e.g., IEEE 802.11ac) as described with respect to reference [8], a receiving wireless communication device (e.g., STA or wireless station) that is capable of receiving MU-MIMO communications shall be required to include additional fields as may be included as appropriate to a given application or context. For example, a minimum rank for the feedback of V, per tone SNR, or singular values, etc., are such fields that may be added upon indication that MU-type feedback is requested.

Certain fields that may be added should be compliant to support MU-type feedback. This consideration is particularly appropriate with respect to providing per-tone-SNR information. Of course, additional fields may be added for MU-type feedback as well.

Per-Tone-SNR for MU-Type Feedback

Unlike SU-MIMO, where feedback of the pair {V,MCS} is sufficient, known MU-MIMO precoding methodologies benefit from knowledge of the transmit correlation $H^H H$. It is proposed herein to add a new field (MU-exclusive Beamforming Report field) at the end of Compressed Beamforming Report field, in order to define the feedback of per-tone-SNR for each space time stream when MU-type feedback is indicated.

This may be defined the per-tone-SNR for each space time stream as the deviation in dB relative to the fed back average SNR per space-time stream (1 to Nc). The new field has an additional 4×Nc bits per tone in accordance with the specifications as follows:

Feedback granularity is 1 dB. Feedback range −8 to 7 dB with 4 bits for each space-time stream.

This new field (per-tone-SNR) is added in MU-exclusive Beamforming Report field

It is signaled by the beamformee (e.g., receiving wireless communication device or STA) using MU-type bit in MIMO control field (such as described with respect to FIG. 23). Whether the report field includes per-tone-SNR depends on the SU/MU-type feedback which is requested by the beamformer.

FIG. 25 is a diagram illustrating an embodiment of a simulation results corresponding to a communication system in which a transmitting wireless communication device has 4 antennae and each of 4 receiving wireless communication devices has a respective 1 antenna.

FIG. 26 is a diagram illustrating an embodiment of per-tone signal to noise ratio (SNR) field in a MU-exclusive beamforming report. This diagram corresponds to a per-tone-SNR field as may be included within a MU-exclusive beamforming report. The proposed field for per-tone-SNR is shown as in the diagram.

Each field for per-tone-SNR at each tone is in the order of the columns of corresponding V matrix: Nd bits for the first column of corresponding V are followed by Nd bits for the second column and so on, up to the last Nc_th column of corresponding V at each tone. The corresponding V is reported in the Compressed Beamforming field (such as in accordance with FIG. 20).

Definition of Per-Tone-SNR

Per-Tone-SNR

—Delta-SNR

Size

—Nd=4 bits

Meaning

—The deviation in dB relative to the fed back average SNR per space-time-stream (1 to Nc), from $-2^{(Nd/2)}$ dB to $2^{(Nd/2)}-1$ dB FIG. 27A, FIG. 27B, and FIG. 27C illustrate various embodiments of methods for operating a communication device.

Referring to method 2700 of FIG. 27A, the method 2700 begins by receiving a frame from a wireless communication device, as shown in a block 2710. The frame may be an NDP-A such as described with respect to other embodiments therein, or maybe some other type of frame. Generally speaking, such a receipt frame may be employed for determining particularly the type of feedback information and format thereof to be provided to the wireless communication device. Such exchanges may be understood with respect to a relationship between a beamformer or transmitting wireless communication device and a beamformee or receiving wireless communication device. Such transmitting and receiving wireless communication devices may be any type of wireless communication devices. In some instances, a transmitting wireless communication device is an access point (AP), and a receiving wireless communication device is a wireless station (STA), or vice versa. In other instances, both the transmitting and the receiving wireless communication devices are STAs.

The method 2700 continues by determining whether the frame provide some indication relating to the type of feedback format to be provided (e.g., such as whether the feedback format should be in accordance with SU-MIMO or MU-MIMO), as shown in a block 2720. In some instances, a value of a particular bit within a predetermined location within the frame will indicate the type of feedback format to be provided. For example, if a given bit within a particular location of the frame is set to 1, then the feedback format should be in accordance with SU-MIMO, and if that given bit within that particular location of the frame set 1, then the feedback format should be in accordance with MU-MIMO. As may be understood, by analyzing a particular value of this particular bit, a receiving wireless communication device may ascertain the operational mode in which it is operating, whether that be in accordance with a SU-MIMO operational mode or a MU-MIMO operational mode.

The method 2700 then operates by determining whether or not operation is in accordance with SU-MIMO and an associated feedback format is to be provided in accordance with SU-MIMO, as shown in a block 2730. If operation is in accordance with SU-MIMO, then the method 2700 continues by generating a first beamforming feedback frame, as shown in a block 2740. Such a beamforming feedback frame is adapted up to eight antennae, or even more antennae. That is to say, certain wireless communication devices may operate with more than four transmit/receive antennae. Such a beamforming feedback frame, as may be constructed in accordance with block 2740, maybe adaptive generally up to any desired number of antennae.

Alternatively, if operation is not in accordance with SU-MIMO and is instead determined to be in accordance with MU-MIMO, then the method 2700 continues by generating a second beamforming feedback frame, as shown in a block 2750. Such a beamforming feedback frame may have any number of particular properties. For example, such a beamforming feedback frame may include per-tone or per-subband eigen-values, respective channel bandwidth indication, etc., as shown in a block 2750.

The method 2700 then operates by transmitting the first or the second beamforming feedback frame to the wireless communication device, as shown in a block 2760. It is noted that different respective beamforming feedback frames may be transmitted to the wireless communication device at different times. For example, during a first time and in accordance with a SU-MIMO operational mode, the first beamforming feedback frame may be transmitted to the wireless communication device. Then, during a second time in accordance with a MU-MIMO operational mode, the second beamforming feedback frame may be transmitted to the wireless communication device. As can be seen, a given receiving wireless communication device may provide beamforming feedback frames of different types in accordance with different formats.

Referring to method 2701 of FIG. 27B, the method 2701 begins by receiving a frame from a wireless communication device, as shown in a block 2711. The frame may be an NDP-A such as described with respect to other embodiments therein, or maybe some other type of frame. Generally speaking, such a receipt frame may be employed for determining particularly the type of feedback information and format thereof to be provided to the wireless communication device.

The method 2701 then operates by determining a feedback rank of a steering matrix as indicated in the frame, as shown in a block 2721. For example, the frame is received may include a request therein for a particular feedback rank of the steering matrix. In such an instance, this requested feedback rank may be determined upon analysis of the received frame.

The method 2701 then continues by generating a beamforming feedback frame in accordance with the determine feedback rank, as shown in a block 2731. The method 2701 then operates by transmitting the beamforming feedback frame to the wireless communication device, as shown in a block 2741.

Referring to method 2702 of FIG. 27C, the method 2702 begins by generating a beamforming feedback frame indicating at least one of a respective plurality of angle resolution values associated with the particular operational mode being employed (e.g., SU-MIMO or MU-MIMO) and per-tone SNR information values corresponding to each space-time stream, as shown in a block 2712. If desired, any number of other characteristics may be included within the beamforming feedback frame as well. For example, such a beamforming feedback frame may include indication of a corresponding channel with being employed, whether that is 20 MHz, 40 MHz, 80 MHz, or 160 MHz.

The method 2702 then continues by transmitting the beamforming feedback frame to the wireless communication device, as shown in a block 2722.

It is also noted that the various operations and functions as described with respect to various methods herein may be performed within a wireless communication device, such as using a baseband processing module and/or a processing module implemented therein (e.g., such as in accordance with the baseband processing module 64 and/or the processing module 50 as described with reference to FIG. 2) and/or other components therein.

For example, such a baseband processing module and/or a processing module (which may be implemented in the same device or separate devices) can perform generation of a beamforming feedback frame, as well as generation of a signal including such a beamforming feedback frame and transmission of that signal using at least one of any number of radios and at least one of any number of antennae of a wireless communication device in accordance with various aspects of the invention, and/or any other operations and functions as described herein, etc. or their respective equivalents. In some embodiments, such a beamforming feedback frame is generated cooperatively by a processing module in a first device, and a baseband processing module within a second device. In other embodiments, such a beamforming feedback frame is generated wholly by a baseband processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

REFERENCES

[1] 20100630 Broadcom Feedback Format.ppt
[2] 20100622 Qualcomm CSI Feedback MU-MIMO.ppt
[3] 20100706 Marvell Feedback Format.ppt
[4] 20100707 Broadcom Sounding Format.ppt
[5] 20100903r3 Accord F2F Tech minutes.doc
[6] 20100929r0 Atheros FB tone mapping.ppt
[7] 20100630 Broadcom Feedback Format.ppt
[8] 20100903r3 Accord F2F Tech minutes.doc
[9] 20100929r0 Atheros FB tone mapping.ppt
[10] 20100622r0 Qualcomm CSI Feedback MU-MIMO.ppt
[11] 20100804r0 Broadcom TxBF Format.ppt
[12] 20100908r1 Marvell CVFB_SU.ppt

APPENDIX

| Size of V (Nr × Nc) | Number of angles (Na) | The order of angles in the Quantized Beamforming Feedback Matrices Information field |
|---|---|---|
| 5 × 1 | 8 | $\phi 11, \phi 21, \phi 31, \phi 41, \psi 21, \psi 31, \psi 41, \psi 51$ |
| 5 × 2 | 14 | $\phi 11, \phi 21, \phi 31, \phi 41, \psi 21, \psi 31, \psi 41, \psi 51, \phi 22, \phi 32, \phi 42, \psi 32, \psi 42, \psi 52$ |
| 5 × 3 | 18 | $\phi 11, \phi 21, \phi 31, \phi 41, \psi 21, \psi 31, \psi 41, \psi 51, \phi 22, \phi 32, \phi 42, \psi 32, \psi 42, \psi 52, \phi 33, \phi 43, \psi 43, \psi 53$ |
| 5 × 4 | 20 | $\phi 11, \phi 21, \phi 31, \phi 41, \psi 21, \psi 31, \psi 41, \psi 51, \phi 22, \phi 32, \phi 42, \psi 32, \psi 42, \psi 52, \phi 33, \phi 43, \psi 43, \psi 53, \phi 44, \psi 54$ |
| 5 × 5 | 20 | $\phi 11, \phi 21, \phi 31, \phi 41, \psi 21, \psi 31, \psi 41, \psi 51, \phi 22, \phi 32, \phi 42, \psi 32, \psi 42, \psi 52, \phi 33, \phi 43, \psi 43, \psi 53, \phi 44, \psi 54$ |
| 6 × 1 | 10 | $\phi 11, \phi 21, \phi 31, \phi 41, \phi 51, \psi 21, \psi 31, \psi 41, \psi 51, \psi 61$ |
| 6 × 2 | 18 | $\phi 11, \phi 21, \phi 31, \phi 41, \phi 51, \psi 21, \psi 31, \psi 41, \psi 51, \psi 61, \phi 22, \phi 32, \phi 42, \phi 52, \psi 32, \psi 42, \psi 52, \psi 62$ |

-continued

| Size of V (Nr × Nc) | Number of angles (Na) | The order of angles in the Quantized Beamforming Feedback Matrices Information field |
|---|---|---|
| 6 × 3 | 24 | $\phi 11, \phi 21, \phi 31, \phi 41, \phi 51, \psi 21, \psi 31, \psi 41, \psi 51, \psi 61, \phi 22, \phi 32, \phi 42, \phi 52, \psi 32, \psi 42, \psi 52, \psi 62, \phi 33, \phi 43, \phi 53, \psi 43, \psi 53, \psi 63$ |
| 6 × 4 | 28 | $\phi 11, \phi 21, \phi 31, \phi 41, \phi 51, \psi 21, \psi 31, \psi 41, \psi 51, \psi 61, \phi 22, \phi 32, \phi 42, \phi 52, \psi 32, \psi 42, \psi 52, \psi 62, \phi 33, \phi 43, \phi 53, \psi 43, \psi 53, \psi 63, \phi 44, \phi 54, \psi 54, \psi 64$ |
| 6 × 5 | 30 | $\phi 11, \phi 21, \phi 31, \phi 41, \phi 51, \psi 21, \psi 31, \psi 41, \psi 51, \psi 61, \phi 22, \phi 32, \phi 42, \phi 52, \psi 32, \psi 42, \psi 52, \psi 62, \phi 33, \phi 43, \phi 53, \psi 43, \psi 53, \psi 63, \phi 44, \phi 54, \psi 54, \psi 64, \phi 55, \psi 65$ |
| 6 × 6 | 30 | $\phi 11, \phi 21, \phi 31, \phi 41, \phi 51, \psi 21, \psi 31, \psi 41, \psi 51, \psi 61, \phi 22, \phi 32, \phi 42, \phi 52, \psi 32, \psi 42, \psi 52, \psi 62, \phi 33, \phi 43, \phi 53, \psi 43, \psi 53, \psi 63, \phi 44, \phi 54, \psi 54, \psi 64, \phi 55, \psi 65$ |
| 7 × 1 | 12 | $\phi 11, \phi 21, \phi 31, \phi 41, \phi 51, \phi 61, \psi 21, \psi 31, \psi 41, \psi 51, \psi 61, \psi 71$ |
| 7 × 2 | 22 | $\phi 11, \phi 21, \phi 31, \phi 41, \phi 51, \phi 61, \psi 21, \psi 31, \psi 41, \psi 51, \psi 61, \psi 71, \phi 22, \phi 32, \phi 42, \phi 52, \phi 62, \psi 32, \psi 42, \psi 52, \psi 62, \psi 72$ |
| 7 × 3 | 30 | $\phi 11, \phi 21, \phi 31, \phi 41, \phi 51, \phi 61, \psi 21, \psi 31, \psi 41, \psi 51, \psi 61, \psi 71, \phi 22, \phi 32, \phi 42, \phi 52, \phi 62, \psi 32, \psi 42, \psi 52, \psi 62, \psi 72, \phi 33, \phi 43, \phi 53, \phi 63, \psi 43, \psi 53, \psi 63, \psi 73$ |
| 7 × 4 | 36 | $\phi 11, \phi 21, \phi 31, \phi 41, \phi 51, \phi 61, \psi 21, \psi 31, \psi 41, \psi 51, \psi 61, \psi 71, \phi 22, \phi 32, \phi 42, \phi 52, \phi 62, \psi 32, \psi 42, \psi 52, \psi 62, \psi 72, \phi 33, \phi 43, \phi 53, \phi 63, \psi 43, \psi 53, \psi 63, \psi 73, \phi 44, \phi 54, \phi 64, \psi 54, \psi 64, \psi 74$ |
| 7 × 5 | 40 | $\phi 11, \phi 21, \phi 31, \phi 41, \phi 51, \phi 61, \psi 21, \psi 31, \psi 41, \psi 51, \psi 61, \psi 71, \phi 22, \phi 32, \phi 42, \phi 52, \phi 62, \psi 32, \psi 42, \psi 52, \psi 62, \psi 72, \phi 33, \phi 43, \phi 53, \phi 63, \psi 43, \psi 53, \psi 63, \psi 73, \phi 44, \phi 54, \phi 64, \psi 54, \psi 64, \psi 74, \phi 55, \phi 65, \psi 65, \psi 75$ |
| 7 × 6 | 42 | $\phi 11, \phi 21, \phi 31, \phi 41, \phi 51, \phi 61, \psi 21, \psi 31, \psi 41, \psi 51, \psi 61, \psi 71, \phi 22, \phi 32, \phi 42, \phi 52, \phi 62, \psi 32, \psi 42, \psi 52, \psi 62, \psi 72, \phi 33, \phi 43, \phi 53, \phi 63, \psi 43, \psi 53, \psi 63, \psi 73, \phi 44, \phi 54, \phi 64, \psi 54, \psi 64, \psi 74, \phi 55, \phi 65, \psi 65, \psi 75, \phi 66, \psi 76$ |
| 7 × 7 | 42 | $\phi 11, \phi 21, \phi 31, \phi 41, \phi 51, \phi 61, \psi 21, \psi 31, \psi 41, \psi 51, \psi 61, \psi 71, \phi 22, \phi 32, \phi 42, \phi 52, \phi 62, \psi 32, \psi 42, \psi 52, \psi 62, \psi 72, \phi 33, \phi 43, \phi 53, \phi 63, \psi 43, \psi 53, \psi 63, \psi 73, \phi 44, \phi 54, \phi 64, \psi 54, \psi 64, \psi 74, \phi 55, \phi 65, \psi 65, \psi 75, \phi 66, \psi 76$ |
| 8 × 1 | 14 | $\phi 11, \phi 21, \phi 31, \phi 41, \phi 51, \phi 61, \phi 71, \psi 21, \psi 31, \psi 41, \psi 51, \psi 61, \psi 71, \psi 81$ |
| 8 × 2 | 26 | $\phi 11, \phi 21, \phi 31, \phi 41, \phi 51, \phi 61, \phi 71, \psi 21, \psi 31, \psi 41, \psi 51, \psi 61, \psi 71, \psi 81, \phi 22, \phi 32, \phi 42, \phi 52, \phi 62, \phi 72, \psi 32, \psi 42, \psi 52, \psi 62, \psi 72, \psi 82$ |
| 8 × 3 | 36 | $\phi 11, \phi 21, \phi 31, \phi 41, \phi 51, \phi 61, \phi 71, \psi 21, \psi 31, \psi 41, \psi 51, \psi 61, \psi 71, \psi 81, \phi 22, \phi 32, \phi 42, \phi 52, \phi 62, \phi 72, \psi 32, \psi 42, \psi 52, \psi 62, \psi 72, \psi 82, \phi 33, \phi 43, \phi 53, \phi 63, \phi 73, \psi 43, \psi 53, \psi 63, \psi 73, \psi 83$ |
| 8 × 4 | 44 | $\phi 11, \phi 21, \phi 31, \phi 41, \phi 51, \phi 61, \phi 71, \psi 21, \psi 31, \psi 41, \psi 51, \psi 61, \psi 71, \psi 81, \phi 22, \phi 32, \phi 42, \phi 52, \phi 62, \phi 72, \psi 32, \psi 42, \psi 52, \psi 62, \psi 72, \psi 82, \phi 33, \phi 43, \phi 53, \phi 63, \phi 73, \psi 43, \psi 53, \psi 63, \psi 73, \psi 83, \phi 44, \phi 54, \phi 64, \phi 74, \psi 54, \psi 64, \psi 74, \psi 84$ |
| 8 × 5 | 50 | $\phi 11, \phi 21, \phi 31, \phi 41, \phi 51, \phi 61, \phi 71, \psi 21, \psi 31, \psi 41, \psi 51, \psi 61, \psi 71, \psi 81, \phi 22, \phi 32, \phi 42, \phi 52, \phi 62, \phi 72, \psi 32, \psi 42, \psi 52, \psi 62, \psi 72, \psi 82, \phi 33, \phi 43, \phi 53, \phi 63, \phi 73, \psi 43, \psi 53, \psi 63, \psi 73, \psi 83, \phi 44, \phi 54, \phi 64, \phi 74, \psi 54, \psi 64, \psi 74, \psi 84, \phi 55, \phi 65, \phi 75, \psi 65, \psi 75, \psi 85$ |
| 8 × 6 | 54 | $\phi 11, \phi 21, \phi 31, \phi 41, \phi 51, \phi 61, \phi 71, \psi 21, \psi 31, \psi 41, \psi 51, \psi 61, \psi 71, \psi 81, \phi 22, \phi 32, \phi 42, \phi 52, \phi 62, \phi 72, \psi 32, \psi 42, \psi 52, \psi 62, \psi 72, \psi 82, \phi 33, \phi 43, \phi 53, \phi 63, \phi 73, \psi 43, \psi 53, \psi 63, \psi 73, \psi 83, \phi 44, \phi 54, \phi 64, \phi 74, \psi 54, \psi 64, \psi 74, \psi 84, \phi 55, \phi 65, \phi 75, \psi 65, \psi 75, \psi 85, \phi 66, \phi 76, \psi 76, \psi 86$ |
| 8 × 7 | 56 | $\phi 11, \phi 21, \phi 31, \phi 41, \phi 51, \phi 61, \phi 71, \psi 21, \psi 31, \psi 41, \psi 51, \psi 61, \psi 71, \psi 81, \phi 22, \phi 32, \phi 42, \phi 52, \phi 62, \phi 72, \psi 32, \psi 42, \psi 52, \psi 62, \psi 72, \psi 82, \phi 33, \phi 43, \phi 53, \phi 63, \phi 73, \psi 43, \psi 53, \psi 63, \psi 73, \psi 83, \phi 44, \phi 54, \phi 64, \phi 74, \psi 54, \psi 64, \psi 74, \psi 84, \phi 55, \phi 65, \phi 75, \psi 65, \psi 75, \psi 85, \phi 66, \phi 76, \psi 76, \psi 86, \phi 77, \phi 87$ |
| 8 × 8 | 56 | $\phi 11, \phi 21, \phi 31, \phi 41, \phi 51, \phi 61, \phi 71, \psi 21, \psi 31, \psi 41, \psi 51, \psi 61, \psi 71, \psi 81, \phi 22, \phi 32, \phi 42, \phi 52, \phi 62, \phi 72, \psi 32, \psi 42, \psi 52, \psi 62, \psi 72, \psi 82, \phi 33, \phi 43, \phi 53, \phi 63, \phi 73, \psi 43, \psi 53, \psi 63, \psi 73, \psi 83, \phi 44, \phi 54, \phi 64, \phi 74, \psi 54, \psi 64, \psi 74, \psi 84, \phi 55, \phi 65, \phi 75, \psi 65, \psi 75, \psi 85, \phi 66, \phi 76, \psi 76, \psi 86, \phi 77, \phi 87$ |

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
|  | Barker |  |  |  |  |  |  |  |  |
| 1 | BPSK |  |  |  |  |  |  |  |  |
|  | Barker |  |  |  |  |  |  |  |  |
| 2 | QPSK |  |  |  |  |  |  |  |  |
| 5.5 | CCK |  |  |  |  |  |  |  |  |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK |  |  |  |  |  |  |  |  |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan |  |  |  |
| 244 | 4940 | Japan |  |  |  |
| 248 | 4960 | Japan |  |  |  |
| 252 | 4980 | Japan |  |  |  |
| 8 | 5040 | Japan |  |  |  |
| 12 | 5060 | Japan |  |  |  |
| 16 | 5080 | Japan |  |  |  |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe |  |  |  |
| 56 | 5280 | USA/Europe |  |  |  |
| 60 | 5300 | USA/Europe |  |  |  |
| 64 | 5320 | USA/Europe |  |  |  |
| 100 | 5500 | USA/Europe |  |  |  |
| 104 | 5520 | USA/Europe |  |  |  |
| 108 | 5540 | USA/Europe |  |  |  |
| 112 | 5560 | USA/Europe |  |  |  |
| 116 | 5580 | USA/Europe |  |  |  |
| 120 | 5600 | USA/Europe |  |  |  |
| 124 | 5620 | USA/Europe |  |  |  |
| 128 | 5640 | USA/Europe |  |  |  |
| 132 | 5660 | USA/Europe |  |  |  |
| 136 | 5680 | USA/Europe |  |  |  |
| 140 | 5700 | USA/Europe |  |  |  |

TABLE 5-continued

Channelization for Table 4

| Channel | Frequency (MHz) | Country | Channel | Frequency (MHz) | Country |
|---|---|---|---|---|---|
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |

TABLE 10-continued

5 GHz, with 40 MHz channels and max bit rate of 486 Mbps

| Rate | TX Antennas | ST Code Rate | Modulation | Code Rate | NBPSC |
|---|---|---|---|---|---|
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. An apparatus, comprising:
a radio for receiving a non-data packet announcement (NDP-A) frame from a wireless communication device;
a baseband processing module for:
determining whether the NDP-A frame indicating single-user multiple input multiple output (SU-MIMO) feedback or multi-user multiple input multiple output (MU-MIMO) feedback based on a value of a bit in a predetermined location within the NDP-A frame;
based on SU-MIMO feedback as indicated by the value of the bit within the NDP-A frame, the baseband processing module for generating a first compressed beamforming feedback frame adaptive up to eight transmit/receive antennae and including a codebook information field adaptive for indicating a first plurality of angle resolution values associated with SU-MIMO operation; and
based on MU-MIMO feedback as indicated by the value of the bit within the NDP-A frame, generating a second compressed beamforming feedback frame including a plurality of per-tone or per-sub-band eigen-values, a channel bandwidth indicated within a multiple-input-multiple-output (MIMO) control channel width field adaptive for indicating any one of at least three different channel widths, and a codebook information field adaptive for indicating a second plurality of angle resolution values associated with MU-MIMO operation; and wherein:
the radio transmitting at least one of the first compressed beamforming feedback frame and the second compressed beamforming feedback frame to the wireless communication device.

2. The apparatus of claim 1, wherein:
the baseband processing module for generating at least one of the first compressed beamforming feedback frame and the second compressed beamforming feedback frame in accordance with a requested feedback rank of a steering matrix as indicated in the NDP-A frame.

3. The apparatus of claim 1, wherein:
the compressed beamforming feedback frame including a plurality of per-tone signal to noise ratio (SNR) information values corresponding to a plurality of space-time streams.

4. The apparatus of claim 3, wherein:
a first subset of the plurality of per-tone SNR information values corresponding to a first of the plurality of space-time streams; and
a second subset of the plurality of per-tone SNR information values corresponding to a second of the plurality of space-time streams; and
the plurality of per-tone SNR information values included within a compressed beamforming report field of the compressed beamforming feedback frame.

5. The apparatus of claim 1, wherein:
the wireless communication device being a beamformer; and
the apparatus being a beamformee.

6. An apparatus, comprising:
a radio for receiving a non-data packet announcement (NDP-A) frame from a wireless communication device; and
a baseband processing module for:
determining whether the NDP-A frame indicating single-user multiple input multiple output (SU-MIMO) feedback or multi-user multiple input multiple output (MU-MIMO) feedback based on a value of a bit in a predetermined location within the NDP-A frame;
based on SU-MIMO feedback as indicated by the value of the bit within the NDP-A frame, generating a first compressed beamforming feedback frame adaptive up to eight transmit/receive antennae; and
based on MU-MIMO feedback as indicated by the value of the bit within the NDP-A frame, generating a second compressed beamforming feedback frame including a plurality of per-tone or per-sub-band eigen-values and a channel bandwidth indicated within a multiple-input-multiple-output (MIMO) control channel width field adaptive for indicating any one of at least three different channel widths; and wherein:
the radio transmitting at least one of the first compressed beamforming feedback frame and the second compressed beamforming feedback frame to the wireless communication device.

7. The apparatus of claim 6, wherein:
the baseband processing module for generating the compressed beamforming feedback frame in accordance with a requested feedback rank of a steering matrix as indicated in the NDP-A frame.

8. The apparatus of claim 6, wherein:
the at least three different channel widths including 20 MHz, 40 MHz, and at least one of 80 MHz and 160 MHz.

9. The apparatus of claim 6, wherein:
the first compressed beamforming feedback frame including a codebook information field adaptive for indicating a first plurality of angle resolution values associated with SU-MIMO operation; and
the second compressed beamforming feedback frame including a codebook information field adaptive for indicating a second plurality of angle resolution values associated with MU-MIMO operation.

10. The apparatus of claim 6, wherein:
the compressed beamforming feedback frame including a plurality of per-tone signal to noise ratio (SNR) information values corresponding to a plurality of space-time streams.

11. The apparatus of claim 10, wherein:
a first subset of the plurality of per-tone SNR information values corresponding to a first of the plurality of space-time streams; and
a second subset of the plurality of per-tone SNR information values corresponding to a second of the plurality of space-time streams; and
the plurality of per-tone SNR information values included within a compressed beamforming report field of the compressed beamforming feedback frame.

12. The apparatus of claim 6, wherein:
the wireless communication device being a beamformer; and
the apparatus being a beamformee.

13. The apparatus of claim 6, wherein:
the wireless communication device being an access point (AP); and
the apparatus being a wireless station (STA).

14. The apparatus of claim 6, wherein:
the wireless communication device being a first wireless station (STA); and
the apparatus being a second STA.

15. A method for operating a first wireless communication device, the method comprising:
receiving a non-data packet announcement (NDP-A) frame from a second wireless communication device;
determining whether the NDP-A frame indicating single-user multiple input multiple output (SU-MIMO) feedback or multi-user multiple input multiple output (MU-MIMO) feedback based on a value of a bit in a predetermined location within the NDP-A frame;
based on SU-MIMO feedback as indicated by the value of the bit within the NDP-A frame, generating a first compressed beamforming feedback frame adaptive up to eight transmit/receive antennae;
based on MU-MIMO feedback as indicated by the value of the bit within the NDP-A frame, generating a second compressed beamforming feedback frame including a plurality of per-tone or per-sub-band eigen-values and a channel bandwidth indicated within a multiple-input-multiple-output (MIMO) control channel width field adaptive for indicating any one of at least three different channel widths; and
transmitting at least one of the first compressed beamforming feedback frame and the second compressed beamforming feedback frame to the second wireless communication device.

16. The method of claim 15, further comprising:
generating the compressed beamforming feedback frame in accordance with a requested feedback rank of a steering matrix as indicated in the NDP-A frame.

17. The method of claim 15, wherein:
the at least three different channel widths including 20 MHz, 40 MHz, and at least one of 80 MHz and 160 MHz.

18. The method of claim 15, wherein:
the first compressed beamforming feedback frame including a codebook information field adaptive for indicating a first plurality of angle resolution values associated with SU-MIMO operation; and
the second compressed beamforming feedback frame including a codebook information field adaptive for indicating a second plurality of angle resolution values associated with MU-MIMO operation.

19. The method of claim 15, wherein:
the compressed beamforming feedback frame including a plurality of per-tone signal to noise ratio (SNR) information values corresponding to a plurality of space-time streams.

20. The method of claim 19, wherein:
a first subset of the plurality of per-tone SNR information values corresponding to a first of the plurality of space-time streams; and
a second subset of the plurality of per-tone SNR information values corresponding to a second of the plurality of space-time streams; and
the plurality of per-tone SNR information values included within a compressed beamforming report field of the compressed beamforming feedback frame.

* * * * *